(12) United States Patent
Depreville et al.

(10) Patent No.: US 10,763,666 B2
(45) Date of Patent: Sep. 1, 2020

(54) VOLTAGE SOURCE CONVERTER

(71) Applicant: General Electric Technology GmbH, Baden (CH)

(72) Inventors: Guillaume Depreville, Massy (FR); Stephane Brehaut, Stafford (GB)

(73) Assignee: General Electric Technology GmbH, Baden (CH)

( * ) Notice: Subject to any disclaimer, the term of this patent is extended or adjusted under 35 U.S.C. 154(b) by 86 days.

(21) Appl. No.: 15/553,341

(22) PCT Filed: Feb. 25, 2016

(86) PCT No.: PCT/EP2016/053991
§ 371 (c)(1),
(2) Date: Aug. 24, 2017

(87) PCT Pub. No.: WO2016/135247
PCT Pub. Date: Sep. 1, 2016

(65) Prior Publication Data
US 2018/0166877 A1  Jun. 14, 2018

(30) Foreign Application Priority Data

Feb. 27, 2015  (EP) .................................. 15275056

(51) Int. Cl.
*H02J 1/00* (2006.01)
*H02M 1/32* (2007.01)
(Continued)

(52) U.S. Cl.
CPC ................. *H02J 1/00* (2013.01); *H02H 9/02* (2013.01); *H02M 1/32* (2013.01); *H02J 1/082* (2020.01); *H02M 2007/4835* (2013.01)

(58) Field of Classification Search
CPC .. H02M 1/32; H02M 2007/4835; H02M 9/02; H02M 1/00; H02J 1/00; H02J 2001/008
See application file for complete search history.

(56) References Cited

U.S. PATENT DOCUMENTS

| | | | |
|---|---|---|---|
| 2010/0067266 A1* | 3/2010 | Dommaschk | H02M 7/483 363/64 |
| 2012/0182771 A1* | 7/2012 | Trainer | H02J 3/1857 363/51 |

(Continued)

FOREIGN PATENT DOCUMENTS

| | | |
|---|---|---|
| CN | 101268607 A | 9/2008 |
| CN | 102484430 A | 5/2012 |

(Continued)

OTHER PUBLICATIONS

International Search Report and Written Opinion issued in connection with corresponding PCT application No. PCT/EP2016/053991 dated Oct. 4, 2016.

(Continued)

Primary Examiner — Alfonso Perez Borroto
Assistant Examiner — Esayas G Yeshaw
(74) Attorney, Agent, or Firm — Eversheds Sutherland (US) LLP

(57) ABSTRACT

A voltage source converter comprises a converter arm extending between two terminals each terminal being connectable to a or a respective electrical network, the converter arm including a valve that includes at least one module, the or each module being operable to selectively provide a voltage source; and a controller programmed to selectively operate the valve to clamp a voltage at either or both of the two terminals and thereby operate the valve as a current limiter to limit a selected current flowing in the converter arm at or below a fixed or variable current threshold.

13 Claims, 32 Drawing Sheets

(51) Int. Cl.
  *H02H 9/02*  (2006.01)
  *H02M 7/483*  (2007.01)
  *H02J 1/08*  (2006.01)

(56) References Cited

U.S. PATENT DOCUMENTS

| | | | | |
|---|---|---|---|---|
| 2012/0201059 | A1* | 8/2012 | Berggren | H02H 7/268 363/53 |
| 2013/0093241 | A1* | 4/2013 | Lewis | H02M 7/797 307/22 |
| 2013/0128639 | A1* | 5/2013 | Ettes | H02M 7/217 363/126 |
| 2016/0094057 | A1* | 3/2016 | Fiedler | G05B 19/0426 320/107 |

FOREIGN PATENT DOCUMENTS

| | | | |
|---|---|---|---|
| GB | 2294821 | A | 5/1996 |
| GB | 2519762 | * | 10/2013 |
| WO | 2007033852 | A2 | 3/2007 |
| WO | 2011012174 | A1 | 2/2011 |
| WO | 2011029480 | A1 | 3/2011 |

OTHER PUBLICATIONS

Colin Oates: "A methodology for developing 'chainlink' converters", 13th European Conference on Power Electronics and Applications, 2009 : EPE '09 Sep. 8-10, 2009, Barcelona, Spain, EEE Piscataway, NJ, USA, Sep. 8, 2009 (Sep. 8, 2009) 1 pp. 1-10, XP031541239, ISBN: 978-1-4244-4432-8 Chapter: "The Current Source Element"; figure 3.

Office Action issued in Chinese Application No. 201680012347.5, dated Jan. 21, 2019, with translation, 24 pages.

Office Action issued in Chinese Application No. 201680012347.5, dated Aug. 26, 2019, with translation, 21 pages.

Search Report issued in European Application No. 15275056, dated Jul. 30, 2015, 5 pages.

* cited by examiner

VOLTAGE SOURCE CONVERTER

BACKGROUND OF THE INVENTION

An embodiment of the present invention relates to a voltage source converter.

In power transmission networks alternating current (AC) power is typically converted to direct current (DC) power for transmission via overhead lines and/or undersea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC to DC power is also utilized in power transmission networks where it is necessary to interconnect AC networks operating at different frequencies. In any such power transmission network, converters are required at each interface between AC and DC power to affect the required conversion.

BRIEF SUMMARY OF THE INVENTION

According to an embodiment of the present invention, there is provided a voltage source converter comprising: a converter arm extending between two terminals, each terminal being connectable to a respective electrical network, the converter arm including a valve that includes at least one module, the or each module being operable to selectively provide a voltage source; and a controller programmed to selectively operate the valve to clamp a voltage at either or both of the two terminals and thereby operate the valve as a current limiter to limit a selected current flowing in the converter arm at or below a fixed or variable current threshold.

In use, the inclusion of the valve in the converter arm enables control of the voltage source converter to perform a voltage source conversion operation. During the voltage source conversion operation, a current flowing in the converter arm may increase beyond its normal operating level or range, thus resulting in an overcurrent in the converter arm. The increase in current flowing in the converter arm may arise, for example, as a result of a fault or disturbance in an associated electrical network, or as a result of component breakdown or deterioration in the converter arm.

The possibility of an overcurrent in the converter arm reduces the life expectancy and increases the risk of destruction of not only the converter arm components (e.g. a switching element) but also other equipment (e.g. power transmission cables) connected to the converter arm. In addition, the presence of an overcurrent in the converter arm could increase the temperature of the converter arm components and thereby adversely affect their performance.

The inclusion of the controller in the voltage source converter according to embodiments of the present invention enables selective limitation of the current flowing in the converter arm to ensure that the current flowing in the converter arm is limited at or below the fixed or variable current threshold. This not only improves the life expectancy and reliability of the converter arm components and other equipment connected to the converter arm, but also prevents an increase in temperature of the converter arm components that could adversely affect their performance.

In addition, as the valve forms part of the converter arm, the use of the valve as a current limiter enables a fast response to the need to limit a current flowing in the converter arm.

Moreover, the inclusion of the controller in the voltage source converter according to embodiments of the present invention obviates the need for installation of separate current limitation equipment to enable selective limitation of a current flowing in the converter arm, thus permitting optimization of the cost, size and weight of the voltage source converter.

The fixed or variable current threshold may be defined, calculated, simulated, estimated, or based on observations before or during the voltage source conversion operation.

In embodiments of the invention the controller may be programmed to operate the valve as a current limiter in response to the selected current reaching or exceeding the current threshold. By configuring the controller to be responsive to an event of the selected current reaching or exceeding the current threshold, it becomes capable of automatically operating the valve as a current limiter when the need arises.

To determine whether the selected current has reached or exceeded the current threshold, the selected current may be directly or indirectly measured, estimated, or observed via the valve, the converter arm, the voltage source converter, or other equipment connected to the voltage source converter (e.g. a transformer).

As mentioned above, an increase in current flowing in the converter arm may arise, for example, as a result of a fault or disturbance in an associated electrical network. In embodiments of the invention, the controller may be programmed to operate the valve as a current limiter during an occurrence of a fault or disturbance in the electrical network or in either or both of the electrical networks. This prevents a high fault current, which arises from occurrence of the fault or disturbance, from flowing in the converter arm.

In this manner, the inclusion of the controller in the voltage source converter according to embodiments of the present invention provide the voltage source converter with fault and disturbance ride through capabilities. This allows the voltage source converter to perform a voltage source conversion operation throughout a fault or disturbance period under certain fault and disturbance conditions, and enables fast recovery of the voltage source converter to normal operating status under other fault and disturbance conditions.

The ability to operate the valve as a current limiter during the occurrence of the fault or disturbance permits the voltage source converter to continue performing a voltage source conversion operation during the fault or disturbance. For example, the controller may be programmed to selectively operate the converter arm to transfer power between the two terminals when the valve is operated as a current limiter. Otherwise it would be necessary to block the converter arm during the fault or disturbance in order to limit the current flowing in the converter arm, thus preventing the voltage source converter from performing a voltage source conversion operation and thereby inconveniencing end users relying on the working of the voltage source converter.

The ability to operate the valve as a current limiter during the occurrence of the fault or disturbance also obviates the need for active control of the current flowing in the converter arm during the fault or disturbance. Such active control of the current flowing in the converter arm can be difficult to execute, and would require use of a complex control algorithm.

Furthermore, the ability to operate the valve as a current limiter during the occurrence of the fault or disturbance removes the need to reduce the lifetime expectancy of the converter arm components to take into account the possibility of a fault or disturbance occurring during the voltage source conversion operation.

It will be appreciated that the valve may be operated as a current limiter during other events other than an occurrence of a fault or disturbance in the electrical network or in either or both of the electrical networks, or even when there is no possibility of an overcurrent in the converter arm.

The or each electrical network may be an AC or DC electrical network. Accordingly, the voltage source converter according to embodiments of the invention may be an AC-DC, DC-AC, AC-AC or DC-DC voltage source converter.

The topology of the voltage source converter may vary depending on the requirements of the associated power application. For example, in embodiments of the invention, the voltage source converter may include: first and second terminals for connection to a first electrical network; and a phase limb extending between the first and second terminals, the phase limb including first and second phase limb portions separated by a third terminal, each phase limb portion extending between the third terminal and a respective one of the first and second terminals, the third terminal being connectable to a second electrical network, either or both of the first and second phase limb portions being in the form of a converter arm, wherein the controller is programmed to selectively operate the or each valve to clamp a voltage at either or both of the third terminal and the corresponding one of the first and second terminals and thereby operate the or each valve as a current limiter to limit a selected current flowing in the respective converter arm at or below a fixed or variable current threshold.

The configuration of each phase limb portion may vary depending on the requirements of the voltage source conversion operation. For example, each phase limb portion may include any of: at least one switching element; at least one reactor; at least one module operable to provide a voltage source; or a combination thereof.

In embodiments of the invention the controller may be programmed to selectively operate the or each valve to clamp a voltage at either or both of the third terminal and the corresponding one of the first and second terminals and thereby operate the or each valve as a current limiter to limit a selected current flowing in or into the phase limb at or below a fixed or variable current threshold. This permits selective limitation of a current flowing into the entire phase limb as opposed to only a current flowing in a converter arm.

The voltage source converter may include a plurality of phase limbs.

In embodiments in which the voltage source converter includes a plurality of phase limbs, the controller may be programmed to selectively operate each valve to clamp a voltage at either or both of the third terminal and the corresponding one of the first and second terminals and thereby operate each valve as a current limiter to limit a selected current flowing between the plurality of phase limbs at or below a fixed or variable current threshold. This allows selective limitation of a current flowing between the plurality of phase limbs (e.g. a current circulating through the plurality of phase limbs) as opposed to only a current flowing in a converter arm or a phase limb.

In further embodiments of the invention the controller may be programmed to selectively operate each phase limb portion to transfer power between the third terminal and the corresponding one of the first and second terminals when the or each valve is operated as a current limiter. As such the voltage source converter is capable of performing a voltage source conversion operation even during the operation of the or each valve as a current limiter.

In embodiments in which the voltage source converter includes a plurality of phase limbs, the third terminal of each phase limb may be connectable to a respective phase of a multi-phase AC electrical network.

In still further embodiments of the invention the controller may be programmed to process at least one voltage parameter to generate a clamping voltage order signal for operating the or each valve as a current limiter. In such embodiments, the or each voltage parameter may be selected from a group including: a voltage at the third terminal; a voltage across the or each converter arm; a voltage of the second electrical network; or a combination of a voltage of the second electrical network and one or more harmonic voltage components.

The or each module may include at least one switching element and at least one energy storage device, the or each switching element and the or each energy storage device in the or each module combining to selectively provide a voltage source.

Each energy storage device may be any device that is capable of storing or releasing energy, e.g. a capacitor or battery.

The or each module may be a unidirectional voltage source that can provide zero or non-zero voltage, and can conduct current in two directions, i.e. the or each module may be a 2-quadrant unipolar module. For example, the or each module may include a pair of switching elements connected in parallel with an energy storage device in a half-bridge arrangement to define a 2-quadrant unipolar module that can provide zero or positive voltage and can conduct current in two directions.

The or each module may be a bidirectional voltage source that can provide negative, zero or positive voltage, and can conduct current in two directions, i.e. the or each module may be a 4-quadrant bipolar module. For example, the or each module may include two pairs of switching elements connected in parallel with an energy storage device in a full-bridge arrangement to define a 4-quadrant bipolar module that can provide negative, zero or positive voltage and can conduct current in two directions.

The or each valve may include a combination of 2-quadrant unipolar modules and 4-quadrant bipolar modules.

The modular arrangement of the or each valve according to embodiments of the present invention means that it is straightforward to increase or decrease the number of modules in the or each valve to achieve a desired rating.

Each switching element may be a self-commutated switching element such as, for example, an insulated gate bipolar transistor, a gate turn-off thyristor, a field effect transistor, an injection-enhanced gate transistor or an integrated gate commutated thyristor.

Each switching element may be a naturally commutated switching element such as, for example, a thyristor or a diode.

It will be understood that, in embodiments in which either or both of the phase limb portions includes at least one switching element, the controller can control the switching of the or each switching element of the corresponding phase limb portion either by sending a turn-on or turn-off control signal to the or each switching element or by operating the or each valve to control the configuration of the voltage waveform at the third terminal to selectively cause switching of the or each switching element, depending on the type of switching element used.

Applications for the voltage source converter according to embodiments of the present invention include: back-to-back converters; line-to-line converters; onshore and offshore wind farms; multi-terminal DC electrical networks, e.g. DC power grids; electrolysis; Flexible AC Transmission Systems devices; filtering equipment; solar, train, metro, subway substations; frequency conversion substations (e.g. 50 Hz to 60 Hz conversion substations); AC-DC, DC-AC, AC-AC, DC-DC conversion, e.g. for train domains, for automobiles bikes and trucks domains, for harbour domains, for civil and military ships domains, for aerospace and for aircraft domains, for military domains, for renewable energy, for nuclear energy, for fossil energy.

It will be appreciated that the use of the terms "first" and "second" to describe features of an embodiment of the present invention is merely intended to help distinguish between similar features (e.g. the first and second phase limb portions), and is not intended to indicate the relative importance of one feature over another feature.

BRIEF DESCRIPTION OF THE DRAWINGS

An embodiment of the invention will now be described, by way of a non-limiting example, with reference to the accompanying drawings in which.

DETAILED DESCRIPTION OF THE INVENTION

Figure 1:
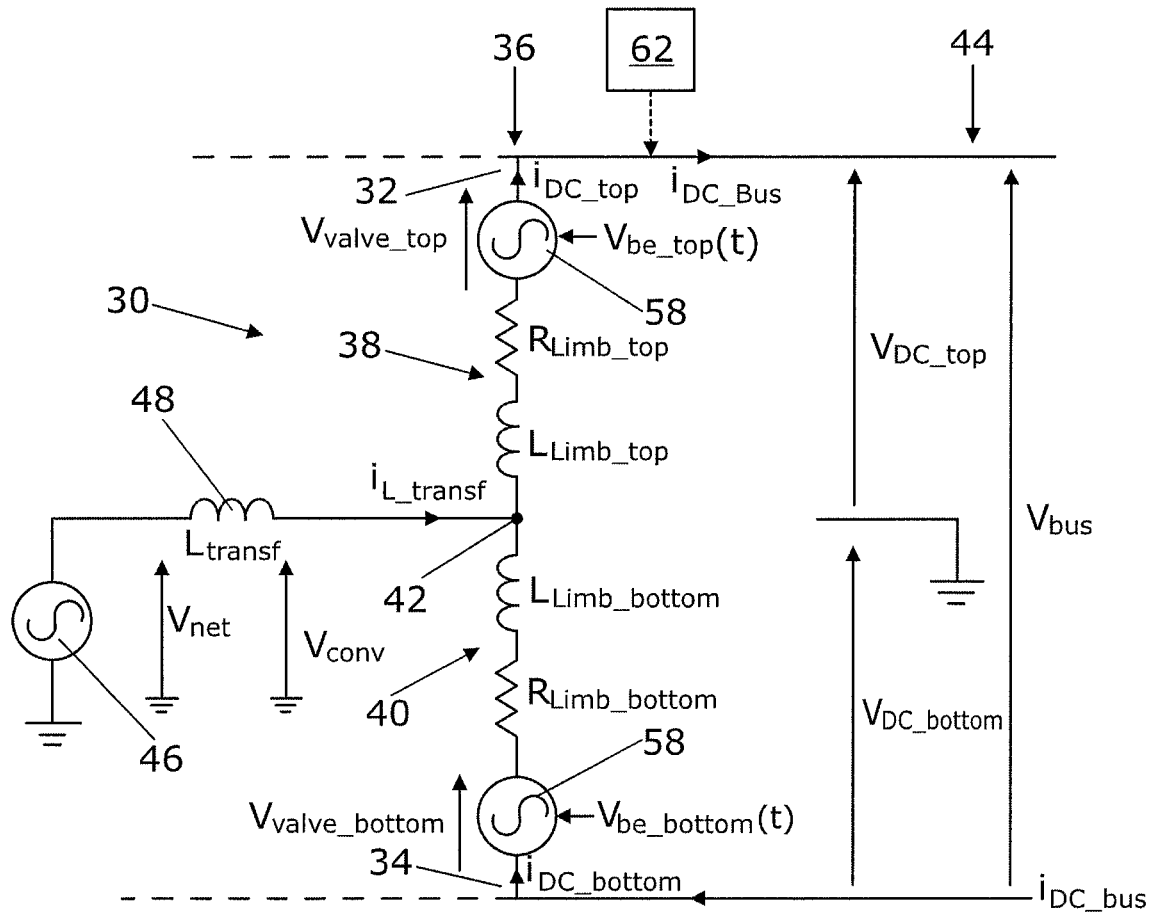
FIG. 1 shows, in schematic form, a voltage source converter.

A voltage source converter according to an embodiment of the present invention is shown in FIG. 1.

The voltage source converter 30 comprises first and second DC terminals 32,34, and a plurality of phase limbs 36. For the purposes of simplicity, FIG. 1 only shows one of the plurality of phase limbs 36, but it will be understood that each of the other phase limbs 36 is identical in structure to the phase limb 36 shown in FIG. 1.

Each phase limb 36 extends between the first and second DC terminals 32,34. Each phase limb 36 includes first and second phase limb portions 38,40 separated by a third terminal 42. In the embodiment shown, the first phase limb portion 38 extends between the first DC terminal 32 and the third terminal 42, and the second phase limb portion 40 extends between the second DC terminal 34 and the third terminal 42.

In use, the first and second DC terminals 32,34 are respectively connected to positive and negative poles of a DC electrical network 44, the positive and negative terminals of the DC electrical network 44 carrying voltages of $V_{DC\_top}$ and $V_{DC\_bottom}$ respectively, and the third terminal 42 of each phase limb 36 is connected to a respective phase of a multi-phase AC electrical network 46 via a transformer 48, which is represented as a transformer inductance in FIG. 1.

It is envisaged that, in other embodiments of the invention, the voltage source converter may have a single phase limb or a different plurality of phase limbs to match the number of phases of an AC electrical network to which the voltage source converter is connected.

Figure 2:
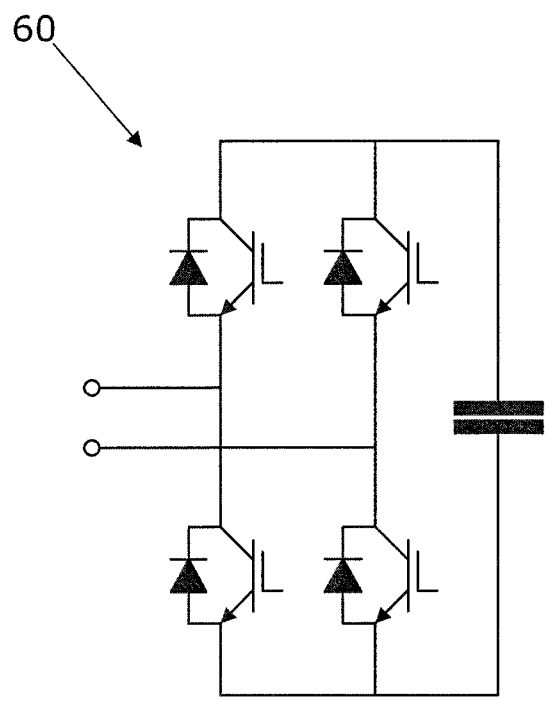
FIG. 2 shows, in schematic form, the structure of a 4-quadrant bipolar module.

The first and second phase limb portions 38,40 are in the form of first and second converter arms 38,40 respectively. Each converter arm 38,40 includes a valve 58. Each valve 58 includes a plurality of series-connected modules 60. Each module 60 includes two pairs of switching elements and an energy storage device in the form of a capacitor. In each module 60, the pairs of switching elements are connected in parallel with the capacitor in a full-bridge arrangement to define a 4-quadrant bipolar module 60 that can provide zero, negative or positive voltage and can conduct current in two directions, as shown in FIG. 2.

Figure 3:
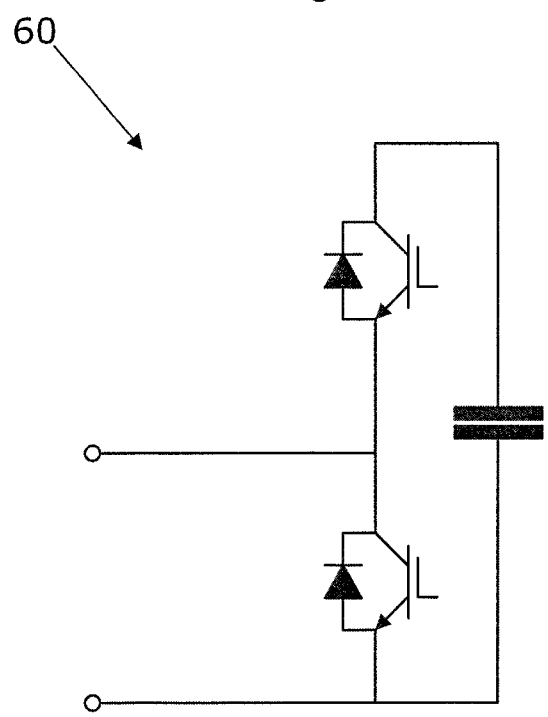
FIG. 3 shows, in schematic form, the structure of a 2-quadrant unipolar module.

It is envisaged that, in other embodiments of the invention, each module 60 may be a unidirectional voltage source that can provide zero or positive voltage. Such a module 60 can conduct current in two directions, i.e. each module 60 may be a 2-quadrant unipolar module 60. For example, each module 60 may include a pair of switching elements connected in parallel with an energy storage device in a half-bridge arrangement to define a 2-quadrant unipolar module 60 that can provide zero or positive voltage and can conduct current in two directions, as shown in FIG. 3.

It is envisaged that, in still other embodiments of the invention, each valve may include a combination of 2-quadrant unipolar modules and 4-quadrant bipolar modules.

Each switching element of each module 60 is constituted by a semiconductor device in the form of an Insulated Gate Bipolar Transistor (IGBT) which is connected in parallel with an anti-parallel diode. It is envisaged that, in other embodiments of the invention, each switching element of each module 60 may be a different switching device such as a gate turn-off thyristor, a field effect transistor, an injection-enhanced gate transistor, an integrated gate commutated thyristor or any other self-commutated semiconductor device.

It is envisaged that, in other embodiments of the invention, the capacitor may be replaced by another energy storage device that is capable of storing and releasing energy, e.g. a battery.

The capacitor of each module 60 is selectively bypassed or inserted into the corresponding valve 58 by changing the state of the switching elements. This selectively directs current through the capacitor or causes current to bypass the capacitor, so that each module 60 provides a zero, negative or positive voltage.

The capacitor of each module 60 is bypassed when the pairs of switching elements in each module 60 are configured to form a short circuit in the module 60, whereby the short circuit bypasses the capacitor. This causes current in the valve 58 to pass through the short circuit and bypass the capacitor, and so the module 60 provides a zero voltage, i.e. the module 60 is configured in a bypassed mode.

The capacitor of each module 60 is inserted into the valve 58 when the pairs of switching elements in each module 60 are configured to allow the current in the valve 58 to flow into and out of the capacitor. The capacitor then charges or discharges its stored energy so as to provide a non-zero voltage, i.e. the module 60 is configured in a non-bypassed mode. The full-bridge arrangement of the switching elements of each module 60 permits configuration of the switching elements to cause current to flow into and out of the capacitor in either direction, and so each module 60 can be configured to provide a negative or positive voltage in the non-bypassed mode.

In this manner, each module 60 is operable to selectively provide a voltage source.

It is possible to build up a combined voltage across each valve 58, which is higher than the voltage available from each of its individual modules 60, via the insertion of the capacitors of multiple modules 60, each providing its own voltage, into each valve 58.

The voltage source converter 30 further includes a controller 62 programmed to operate each valve 58 through control of the switching of the switching elements in each module 60. More particularly, the controller 62 generates a respective voltage order signal $V_{be\_top}$, $V_{be\_bottom}$ for operating each valve 58 to generate a valve voltage $V_{valve\_top}$, $V_{valve\_bottom}$ thereacross. Each voltage order signal $V_{be\_top}$, $V_{be\_bottom}$ is the image of the respective valve voltage $V_{valve\_top}$, $V_{valve\_bottom}$, and consists of a DC voltage component and an AC voltage component.

Operation of the voltage source converter 30 of FIG. 1 is described as follows, with reference to FIGS. 4 to 35.

For the purposes of this specification, the operation of the voltage source converter 30 is primarily described with reference to one of its plurality of phase limbs 36. It will be appreciated that the described operation of one of the plurality of phase limbs 36 of the voltage source converter 30 applies mutatis mutandis to the operation of each of the other phase limbs 36.

During control of the voltage source converter 30 to perform a voltage source conversion operation, the controller 62 controls the switching of the switching elements of each module 60 to selectively provide a voltage source and thereby modify the valve voltage $V_{valve\_top}$, $V_{valve\_bottom}$ of the respective valve 58. This enables control over the configuration of the AC voltage at the third terminal 42 to permit interconnection of the AC and DC electrical networks 46,44 and thereby enable transfer of power between the AC and DC electrical networks 46,44.

For the purposes of this specification, the voltage of the capacitors of the modules 60 in each valve 58 are assumed to be balanced, there is an infinite number of modules 60 per converter arm 38,40, and the switching frequency of the switching elements in each module 60 is assumed to be infinite to provide a perfect sinusoidal AC voltage at the third terminal 42. As such each converter arm 38,40 can be represented by an equivalent voltage source in series with a reactor, as shown in FIG. 1.

The electrical characteristics of each phase limb 36 are given by the following equations:

$$i_{DC\_top} = i_{L\_transf}/2 + i_{DC\_Bus}/\text{n\_phase}$$

$$i_{DC\_bottom} = -i_{L\_transf}/2 + i_{DC\_Bus}/\text{n\_phase}$$

$$i_{L\_transf} = i_{DC\_top} - i_{DC\_bottom}$$

$$2*i_{DC\_Bus}/\text{n\_phase} = i_{DC\_top} + i_{DC\_bottom}$$

$$V_{net} \cdot M_{Transfo\_Model} = V_{transf} + V_{conv} =$$

$$i_{L\_transf} \cdot L_{transf} + V_{conv} = (i_{DC\_top} - i_{DC\_bottom}) \cdot L_{transf} + V_{conv}$$

$$V_{conv} - i_{DC\_top} * R_{Limb\_top} - L_{Limb} \cdot \frac{di_{DC\_top}}{dt} + V_{valve\_top} - V_{DC\_top} = 0$$

$$V_{conv} + i_{DC\_bottom} * R_{Limb\_bottom} +$$

$$L_{Limb} \cdot \frac{di_{DC\_bottom}}{dt} - V_{valve\_bottom} + V_{DC\_bottom} = 0$$

where $i_{DC\_top}$ is the current flowing in the first converter arm 38; $i_{DC\_bottom}$ is the current flowing in the second converter arm 40; $i_{L\_transf}$ is the current flowing in the transformer 48; $i_{DC\_Bus}$ is the current flowing in the first and second DC terminals 32,34; n_phase is the number of phase limbs 36; $V_{net}$ is the AC voltage of the AC electrical network 46; $m_{Transfo\_Model}$ is the turn ratio of the transformer 48; $V_{transf}$ is the AC voltage across the transformer 48; $V_{conv}$ is the AC voltage at the third terminal 42 (i.e. the voltage between the voltage source converter 30 and the transformer 48); $L_{transf}$ is the inductance of the transformer 48; $R_{Limb\_top}$ is the resistance of the first converter arm 38; $R_{Limb\_bottom}$ is the resistance of the second converter arm 40; $L_{Limb}$ is the inductance of the respective converter arm 38,40; $V_{DC\_top}$ is the DC voltage at the first DC terminal 32; $V_{DC\_bottom}$ is the DC voltage at the second DC terminal 34.

During the voltage source conversion operation, a current flowing in each converter arm 38,40 may increase beyond its normal operating level or range as a result of a fault or disturbance in an associated electrical network 44,46, thus resulting in an overcurrent in each converter arm 38,40.

Figure 4:
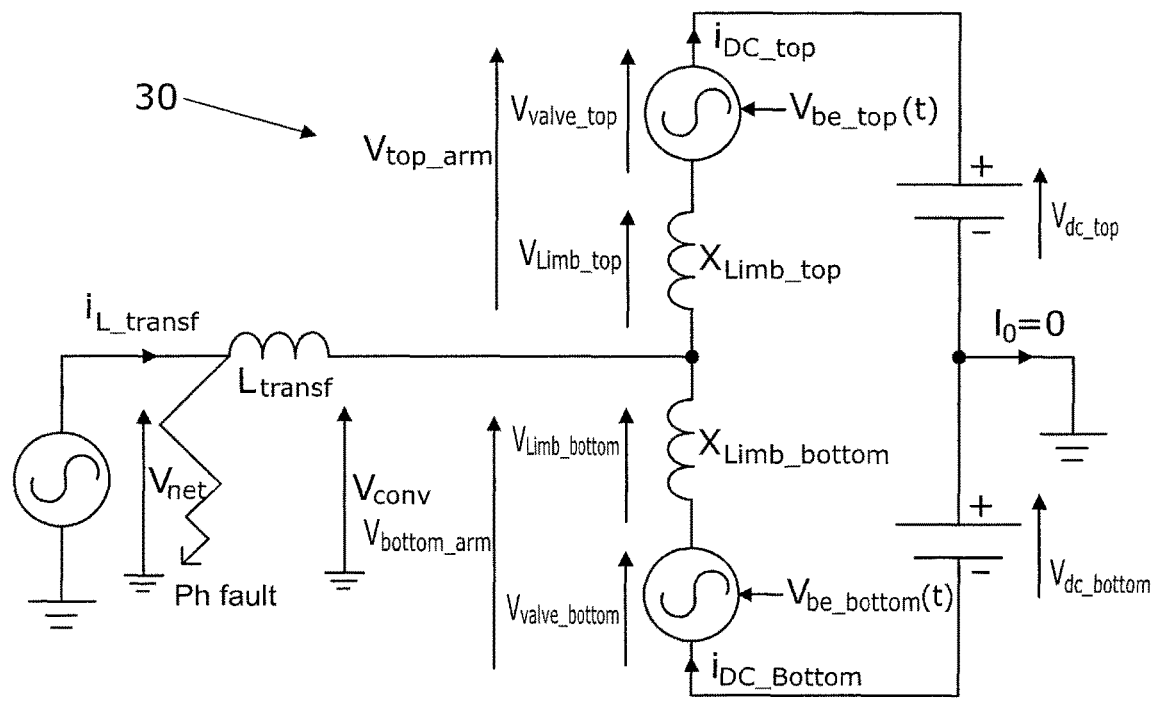
FIG. 4 illustrates, in schematic form, the occurrence of a fault in an AC electrical network.

FIG. 4 illustrates, in schematic form, the occurrence of a fault in the AC electrical network 46.

Figure 5:
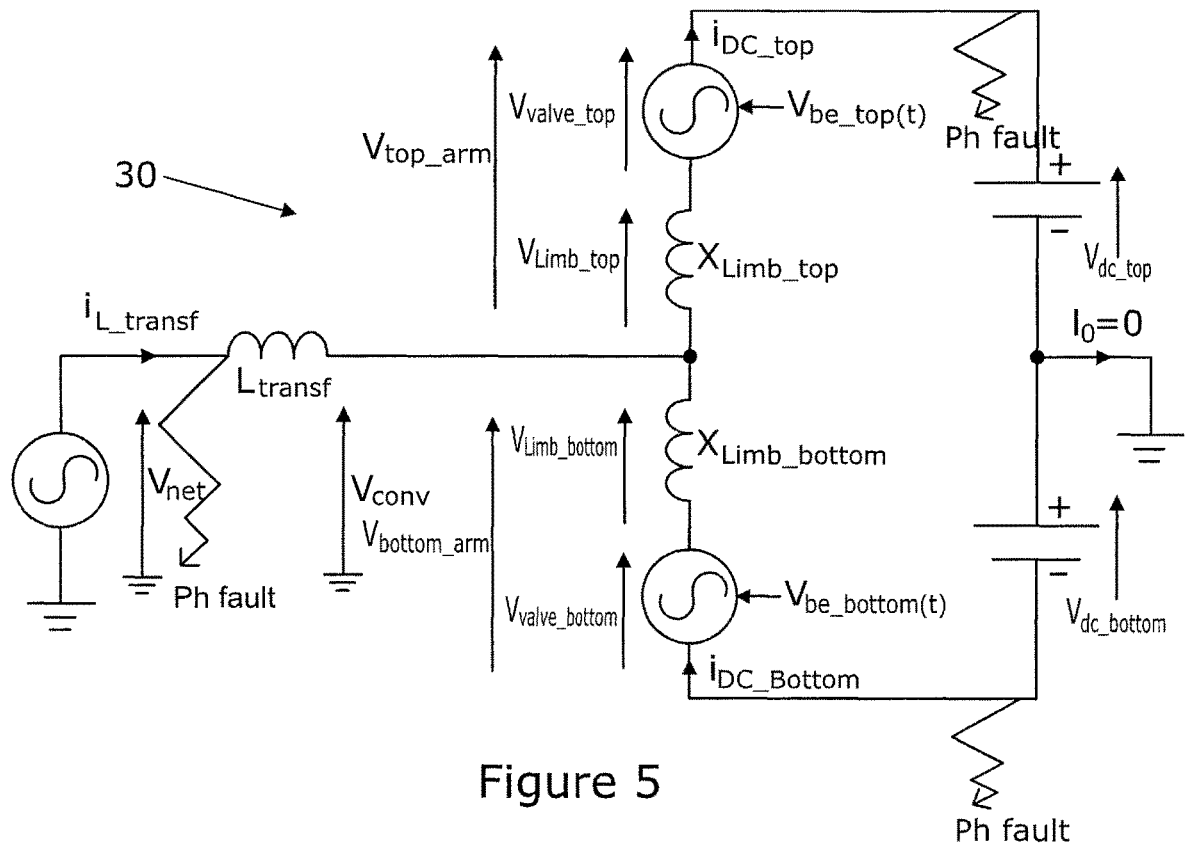
FIG. 5 illustrates, in schematic form, the occurrence of a fault at each pole of a DC electrical network.

FIG. 5 illustrates, in schematic form, the occurrence of a fault at each pole of the DC electrical network 44. It will be appreciated that a fault may occur at only one of the poles of the DC electrical network 44.

The possibility of an overcurrent in each converter arm 38,40 reduces the life expectancy and increases the risk of destruction of not only the converter arm components but also other equipment (e.g. power transmission cables) connected to each converter arm 38,40. In addition the presence of an over current in each converter arm 38,40 could increase the temperature of the converter arm components and thereby adversely affect their performance.

Figure 6:
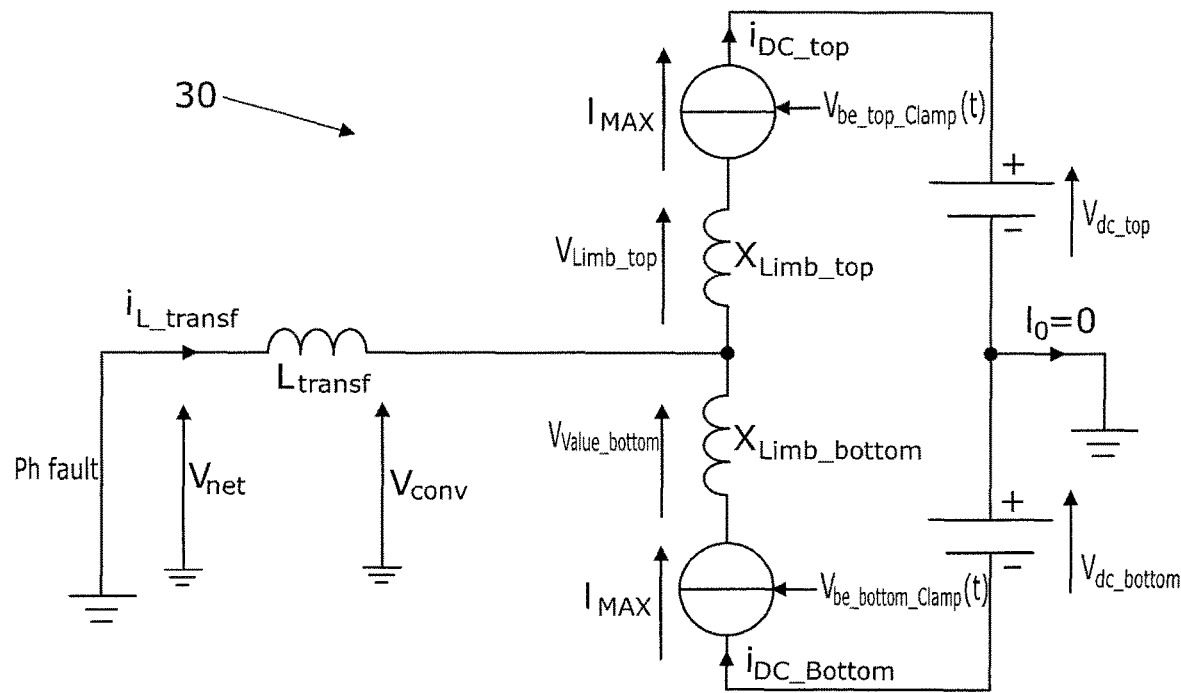
FIGS. 6 and 7 illustrate, in schematic form, the operation of valves shown in FIG. 1 as current limiters during the occurrence of the faults of FIGS. 4 and 5 respectively.
Figure 7:
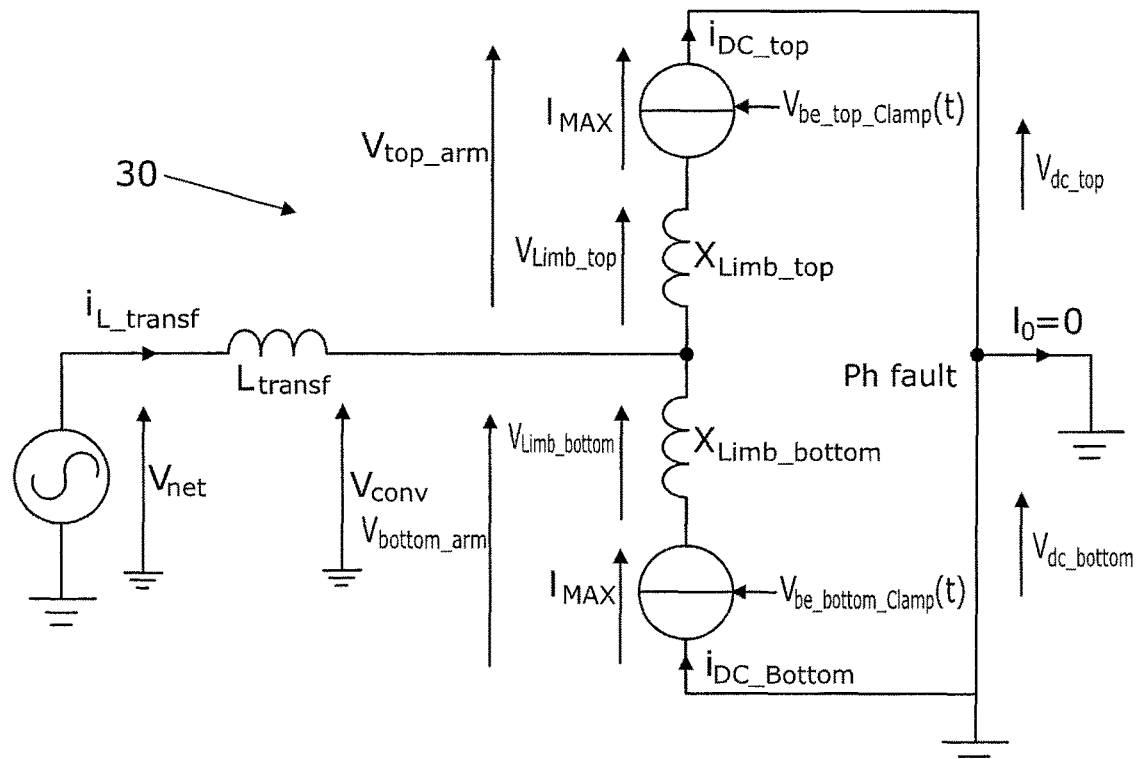

During the occurrence of the fault or disturbance in an associated electrical network 44,46, the controller 62 operates each valve 58 as a current limiter to limit a selected current flowing in the respective converter arm 38,40, a selected current flowing into the phase limb 36 and/or a selected current circulating between two or three of the plurality of phase limbs 36 at or below a fixed or variable current threshold. More particularly, the controller 62 generates a respective clamping voltage order signal $V_{be\_top\_Clamp}$, $V_{be\_bottom\_Clamp}$, by clamping the AC voltage component of the clamping voltage order signal $V_{be\_top\_Clamp}$, $V_{be\_bottom\_Clamp}$, for operating each valve 58 to clamp a voltage at either or both of the third terminal 42 and the corresponding one of the first and second terminals 32,34. Operating each valve 58 in accordance with the respective clamping voltage order signal $V_{be\_top\_Clamp}$, $V_{be\_bottom\_Clamp}$ result in each valve 58 forming the equivalent of a current source to limit the selected current, as shown in FIGS. 6 and 7 which illustrates schematically the operation of the valves 58 as current limiters during the occurrence of the faults in the AC and DC electrical networks 46,44 respectively.

The value of each clamping voltage order signal $V_{be\_top\_Clamp}$, $V_{be\_bottom\_Clamp}$ is dependent on the value of the fixed or variable current threshold, which may be defined, calculated, simulated, estimated or based on observations before or during the voltage source conversion operation.

The controller 62 may be programmed to operate each valve 58 as a current limiter in response to the selected current reaching or exceeding the current threshold. By configuring the controller 62 to be responsive to an event of the selected current reaching or exceeding the current threshold, it becomes capable of automatically operating each valve 58 as a current limiter when the need arises. To determine whether the selected current has reached or exceeded the current threshold, the selected current may be directly or indirectly measured, estimated, or observed via each valve 58, each converter arm 38,40, the voltage source converter 30 or other equipment connected to the voltage source converter 30.

The inclusion of the controller 62 in the voltage source converter 30 enables selective limitation of the current flowing in each converter arm 38,40 to ensure that the current flowing in each converter arm 38,40 is limited at or below the fixed or variable current threshold. This prevents a high fault current, which arises from occurrence of the fault or disturbance, from flowing in each converter arm 38,40. This not only improves the life expectancy and reliability of the converter arm components and other equipment connected to each converter arm 38,40, but also prevents an increase in temperature of the converter arm components that could adversely affect their performance.

In addition, as each valve 58 forms part of the respective converter arm 38,40, the use of the valves 58 as current limiters enables a fast response to the need to limit a current flowing in each converter arm 38,40.

Moreover, the inclusion of the controller 62 in the voltage source converter 30 obviates the need for installation of separate current limitation equipment to enable selective limitation of a current flowing in each converter arm 38,40, thus permitting optimization of the cost, size and weight of the voltage source converter 30.

In this manner, the inclusion of the controller 62 in the voltage source converter 30 provides the voltage source converter 30 with fault and disturbance ride through capabilities. This allows the voltage source converter 30 to perform a voltage source conversion operation throughout a fault or disturbance period under certain fault and disturbance conditions (such as a fault in one phase or faults in two phases of the AC electrical network 46), and enables fast recovery of the voltage source converter 30 to normal operating status under other fault and disturbance conditions (such as faults in all three phases of the AC electrical network 46).

The ability to operate the valves 58 as current limiters during the occurrence of the fault or disturbance allows the controller 62 to be programmed to operate the converter arms 38,40 to transfer power between the third terminal 42 and the corresponding one of the first and second terminals 32,34 when the respective valve 58 is operated as a current limiter. As such the ability to operate the valves 58 as current limiters during the occurrence of the fault or disturbance permits the voltage source converter 30 to continue performing a voltage source conversion operation during the fault or disturbance. Otherwise it would be necessary to block the converter arms 38,40 during the fault or disturbance in order to limit the current flowing in each converter arm 38,40, thus preventing the voltage source converter 30 from performing a voltage source conversion operation and thereby inconveniencing end users relying on the working of the voltage source converter 30.

The ability to operate the valves 58 as current limiters during the occurrence of the fault or disturbance also obviates the need for active control of the current flowing in each converter arm 38,40 during the fault or disturbance. Such active control of the current flowing in each converter arm 38,40 can be difficult to execute, and would require use of a complex control algorithm.

Furthermore, the ability to operate the valves 58 as current limiters during the occurrence of the fault or disturbance removes the need to reduce the lifetime expectancy of the converter arm components to take into account the possibility of a fault or disturbance occurring during the voltage source conversion operation.

The controller 62 may be programmed in various ways to enable it to operate each valve 58 as a current limiter, examples of which are described as follows.

In each of the following examples, where applicable, each of the gain values KP and KC can be any fixed value or any dynamic value. For instance, the dynamic value may be a function of the error between the measured current and the current demand, and/or can be a function of $L_{Limb}$ in real time, and/or a function of the frequency of the AC electrical network 46. For example, $KP=KC=2\cdot\pi\cdot f\cdot \leq L_{Limb}$, where f is the fundamental frequency of the AC electrical network 46.

Example 1

Figure 8:
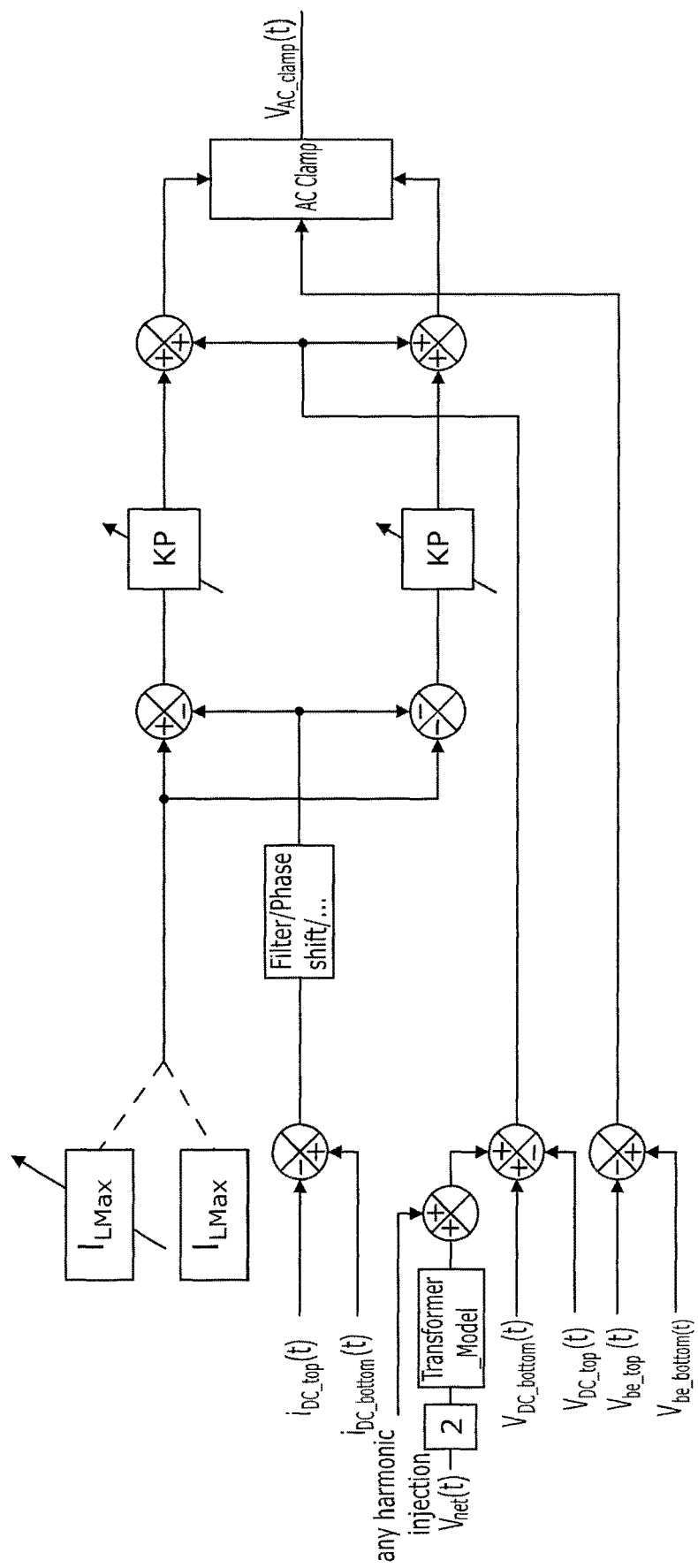
FIGS. 8 and 9 show in combination a first topology of the controller.

FIG. 8 shows a first topology of the controller 62, which is programmed to generate a value of the clamping voltage $V_{AC\_Clamp}$ at the third terminal 42 required to limit the current $i_{L\_transf}$ flowing into the phase limb 36 at or below a current threshold $I_{LMax}$ in accordance with the following equations:

$$2\cdot V_{conv} - L_{Limb}\cdot \frac{di_{DC\_top}}{dt} + L_{Limb}\cdot \frac{di_{DC\_bottom}}{dt} +$$
$$V_{top\_valve} - V_{bottom\_valve} - V_{DC\_top} + V_{DC\_bottom} = 0$$

$$2\cdot V_{conv} + L_{Limb}\cdot \left(\frac{di_{DC\_bottom}}{dt} - \frac{di_{DC\_top}}{dt}\right) - V_{DC\_top} + V_{DC\_bottom} =$$
$$V_{bottom\_valve} - V_{top\_valve}$$

-continued $$2 \cdot V_{conv} - L_{Limb} \cdot \left(\frac{di_{L\_transf}}{dt}\right) - V_{DC\_top} + V_{DC\_bottom} =$$

$$V_{bottom\_valve} - V_{top\_valve}$$

$$2 \cdot V_{conv} - L_{Limb} \cdot \left(\frac{di_{L\_transf}}{dt}\right) - V_{DC\_top} + V_{DC\_bottom} =$$

$$V_{bottom\_valve} - V_{top\_valve}$$

$$2 \cdot V_{conv} = 2 \cdot V_{net} - 2 \cdot (i_{DC\_top} - i_{DC\_bottom}) \cdot L_{transf}$$

$$2 \cdot V_{net} \cdot M_{Transfo\_Model} - \left((2 \cdot L_{transf} + L_{Limb}) \cdot \left(\frac{di_{L\_transf}}{dt}\right)\right) -$$

$$V_{DC\_top} + V_{DC\_bottom} = V_{bottom\_valve} - V_{top\_valve}$$

$$\lfloor V_{bottom\_valve}(t) - V_{top\_valve}(t) \rfloor_{Clamp} = 2 \cdot M_{Transfo\_Model} \cdot V_{net}(t) +$$

$$V_{DC\_bottom}(t) - V_{DC\_top}(t) + (I_{LMax} - (i_{DC\_bottom} - i_{DC\_top})) \cdot KP$$

$$\lfloor V_{bottom\_valve}(t) - V_{top\_valve}(t) \rfloor_{Clamp} = 2 \cdot M_{Transfo\_Model} \cdot V_{net}(t) +$$

$$V_{DC\_bottom}(t) - V_{DC\_top}(t) + (I_{LMax} - (i_{L\_transf})) \cdot KP$$

$$\lfloor V_{AC\_Clamp(t)} \rfloor = \lfloor V_{valve\_bottom}(t) - V_{valve\_top}(t) \rfloor_{Clamp}$$

where $R_{Limb\_top}$ and $R_{Limb\_bottom}$ are considered to be zero; $I_{LMax}$ is the current threshold for a current flowing in the transformer 48; $V_{AC\_Clamp}$ is the value of the clamping voltage at the third terminal 42 required to limit the current $i_{L\_transf}$ flowing into the phase limb 36 at or below the current threshold $I_{LMax}$.

Figure 9:
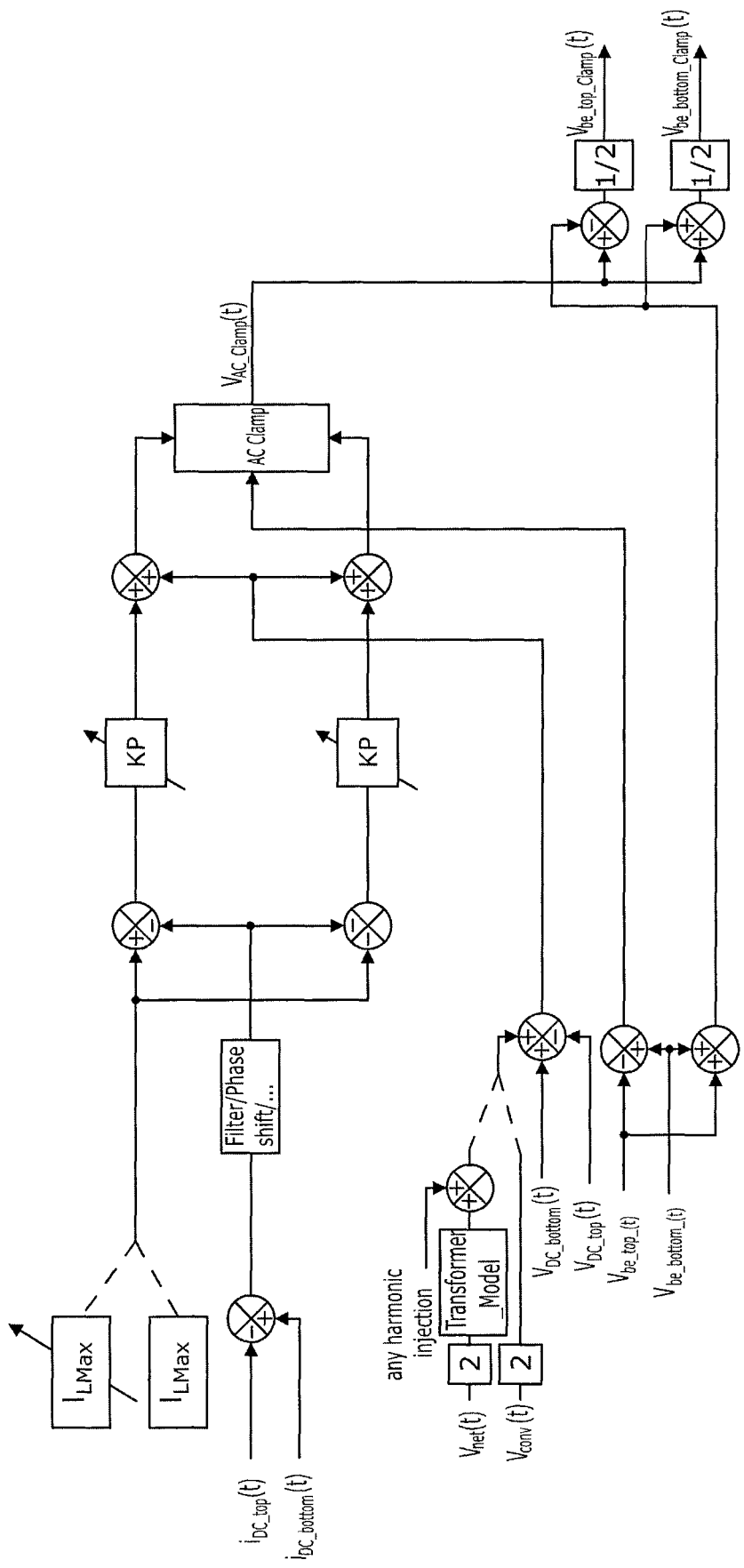

In this manner, as shown in FIG. 8, the controller 62 generates the clamping voltage value $V_{AC\_Clamp}$ at the third terminal 42 required to limit the current $i_{L\_transf}$ flowing into the phase limb 36 at or below the current threshold $I_{LMax}$. As shown in FIG. 9, the controller 62 is programmed to generate a respective clamping voltage order signal $V_{be\_top\_Clamp}$, $V_{be\_bottom\_Clamp}$ for operating each valve 58 to clamp an AC voltage at the third terminal 42 at the clamping voltage value $V_{AC\_Clamp}$. In this manner, the controller is programmed to operate each valve 58 as a current limiter to limit a selected current $i_{L\_transf}$ flowing into the phase limb 36 at or below the current threshold $I_{LMax}$.

It will be appreciated that, instead of processing the AC voltage $V_{net}$ of the AC electrical network 46 during generation of the clamping voltage value $V_{AC\_Clamp}$, the controller may instead process a combination of the AC voltage $V_{net}$ of the AC electrical network 46 and one or more harmonic voltage components in order to operate each valve 58 as a current limiter, as shown in FIG. 9.

Example 2

Figure 10:
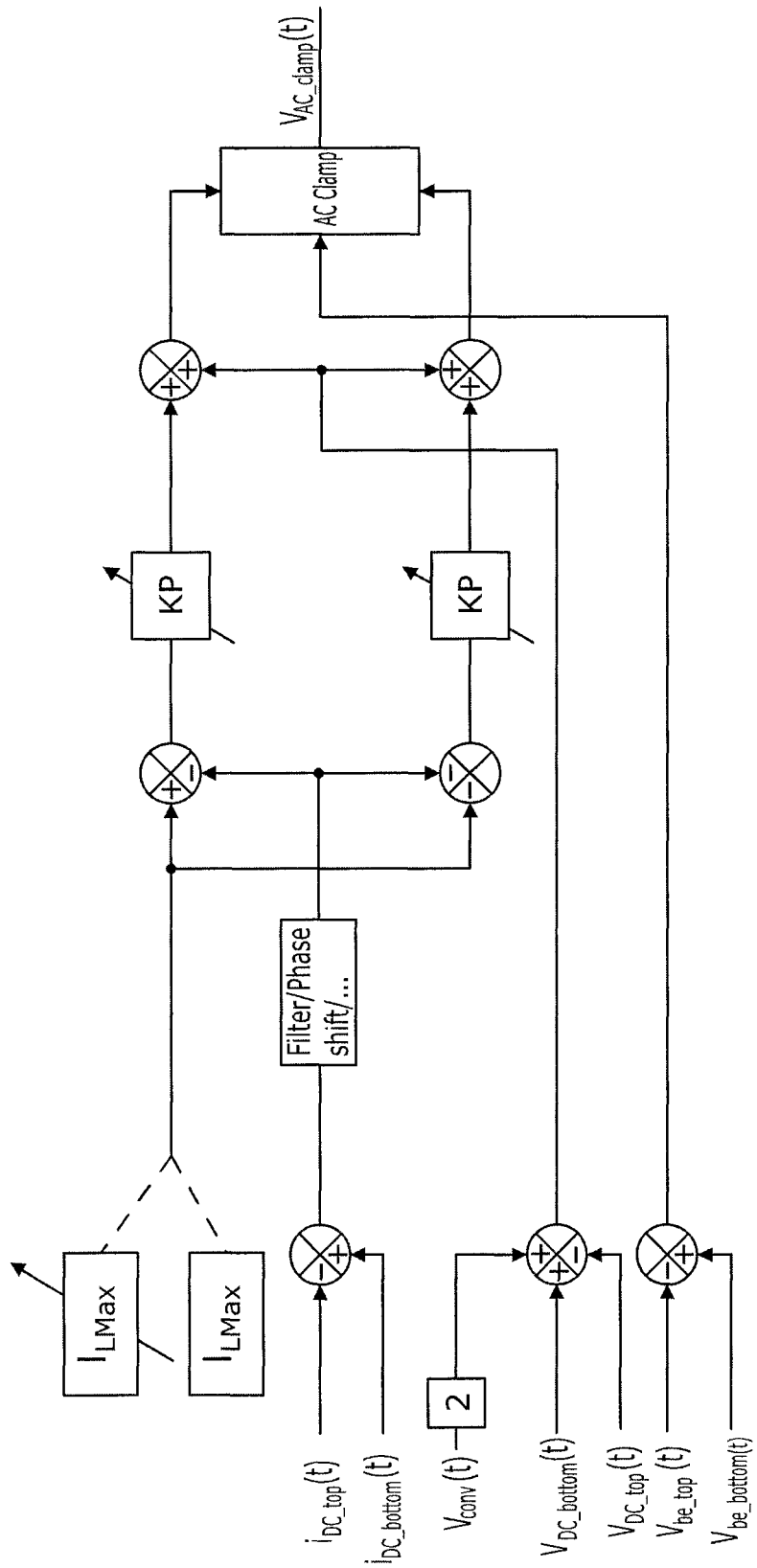
FIGS. 10 and 11 show in combination a second topology of the controller.
Figure 11:
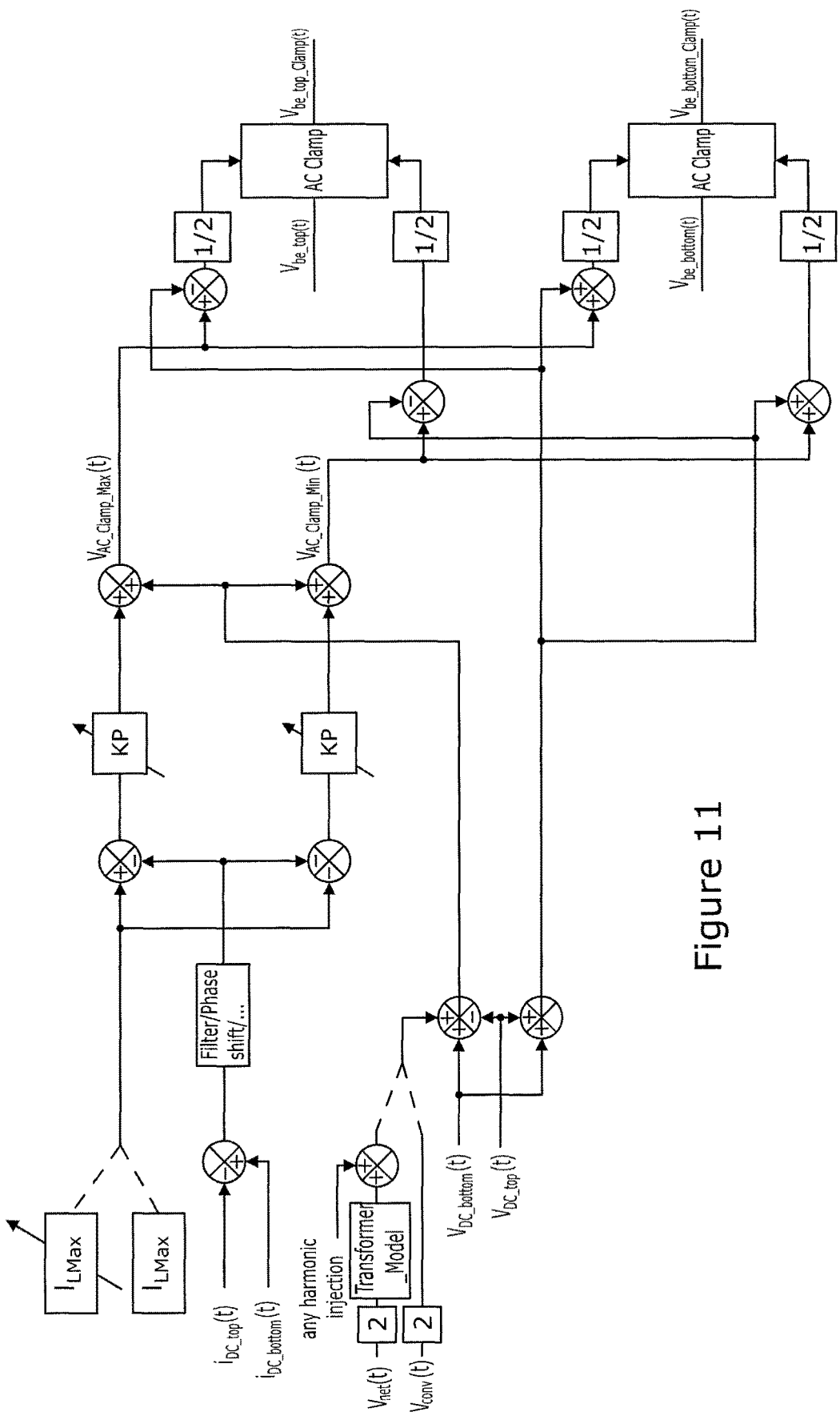

FIGS. 10 and 11 show in combination a second topology of the controller 62, which is programmed to generate a value $V_{AC\_Clamp}$ of the clamping voltage at the third terminal 42 required to limit the current $i_{L\_transf}$ flowing into the phase limb 36 at or below a current threshold $I_{LMax}$ in accordance with the following equations:

$$2 \cdot V_{conv} - L_{Limb} \cdot \frac{di_{DC\_top}}{dt} + L_{Limb} \cdot \frac{di_{DC\_bottom}}{dt} +$$

$$V_{valve\_top} - V_{valve\_bottom} - V_{DC\_top} + V_{DC\_bottom} = 0$$

$$2 \cdot V_{conv} + L_{Limb} \cdot \left(\frac{di_{DC\_bottom}}{dt} - \frac{di_{DC\_top}}{dt}\right) - V_{DC\_top} + V_{DC\_bottom} =$$

$$V_{valve\_bottom} - V_{valve\_top}$$

-continued $$2 \cdot V_{conv} - L_{Limb} \cdot \left(\frac{di_{L\_transf}}{dt}\right) - V_{DC\_top} + V_{DC\_bottom} =$$

$$V_{valve\_bottom} - V_{valve\_top}$$

$$2 \cdot V_{conv} - L_{Limb} \cdot \left(\frac{di_{L\_transf}}{dt}\right) - V_{DC\_top} + V_{DC\_bottom} =$$

$$V_{valve\_bottom} - V_{valve\_top}$$

$$\lfloor V_{valve\_bottom}(t) - V_{valve\_top}(t) \rfloor_{Clamp} = 2 \cdot V_{Conv}(t) +$$

$$V_{DC\_bottom}(t) - V_{DC\_top}(t) + (I_{LMax} - (i_{DC\_bottom} - i_{DC\_top})) \cdot KP$$

$$\lfloor V_{AC\_Clamp(t)} \rfloor = \lfloor V_{valve\_bottom}(t) - V_{valve\_top}(t) \rfloor_{Clamp}$$

Again, $R_{Limb\_top}$ and $R_{Limb\_bottom}$ are considered to be zero.

The second topology in FIG. 10 differs from the first topology in FIG. 8 in that the controller 62 is programmed to generate the clamping voltage value $V_{AC\_Clamp}$ by processing the AC voltage $V_{conv}$ at the third terminal 42, instead of the AC voltage $V_{net}$ of the AC electrical network 46.

As shown in FIG. 11, the controller 62 is programmed to generate a respective clamping voltage order signal $V_{be\_top\_Clamp}$, $V_{be\_bottom\_Clamp}$ for operating each valve 58 to clamp an AC voltage at the third terminal 42 at the clamping voltage value $V_{AC\_Clamp}$. In this manner, the controller is programmed to operate each valve 58 as a current limiter to limit a selected current $i_{L\_transf}$ flowing into the phase limb 36 at or below the current threshold $I_{LMax}$.

Example 3

Figure 12:
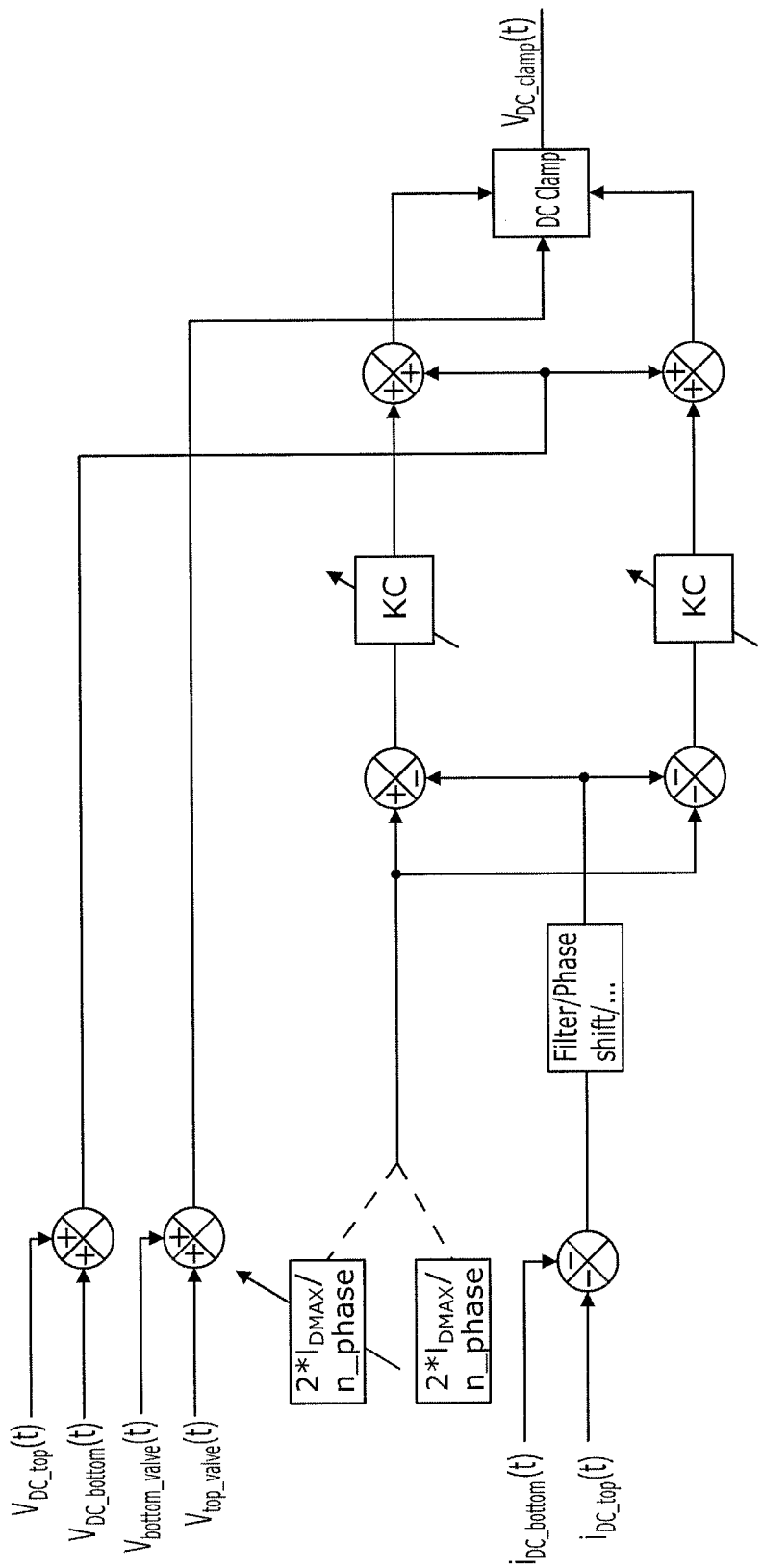
FIG. 12 shows a third topology of the controller.

FIG. 12 shows a third topology of the controller 62, which is programmed to generate a value $V_{DC\_Clamp}$ of the clamping voltage across the first and second DC terminals 32,34 required to limit the current flowing in the phase limb 36 at or below a current threshold in accordance with the following equations:

$$-L_{Limb} \cdot \frac{di_{DC\_top}}{dt} - L_{Limb} \cdot \frac{di_{DC\_bottom}}{dt} +$$

$$V_{top\_valve} + V_{bottom\_valve} - V_{dc\_top} - V_{dc\_bottom} = 0$$

$$L_{Limb} \cdot \left(\frac{di_{DC\_top}}{dt} + \frac{di_{DC\_bottom}}{dt}\right) + V_{DC\_top} + V_{DC\_bottom} =$$

$$V_{top\_valve} + V_{bottom\_valve}$$

$$L_{Limb} \cdot \left(\frac{2}{\text{n\_phase}} \cdot \frac{di_{DC\_Bus}}{dt}\right) + V_{DC\_top} + V_{DC\_bottom} =$$

$$V_{top\_valve} + V_{bottom\_valve}$$

$$[V_{bottom\_valve}(t) + V_{top\_valve}(t)]_{Clamp} =$$

$$V_{DC\_bottom}(t) + V_{DC\_top}(t) + \left(\frac{2 \cdot I_{DC\_Max}}{\text{n\_phase}} - (i_{DC\_top} + i_{DC\_bottom})\right) \cdot KC$$

$$V_{DC\_Clamp} = [V_{bottom\_valve}(t) + V_{top\_valve}(t)]_{Clamp}$$

where $I_{LMax}$ is the current threshold for a current flowing in the transformer 48. In this manner, as shown in FIG. 12, the controller 62 generates the clamping voltage value $V_{DC\_Clamp}$ across the first and second DC terminals 32,34 required to limit the current flowing in the phase limb 36 at or below a current threshold $I_{LMax}$. The controller 62 is programmed to generate a respective clamping voltage order signal $V_{be\_top\_Clamp}$, $V_{be\_bottom\_Clamp}$ for operating each valve 58 to clamp a DC voltage across the first and second DC terminals 32,34 at the clamping voltage value $V_{DC\_Clamp}$. In this manner, the controller is programmed to operate each valve 58 as a current limiter to limit a selected current flowing in the phase limb 36 at or below a current threshold $I_{LMax}$.

Example 4

Figure 13:
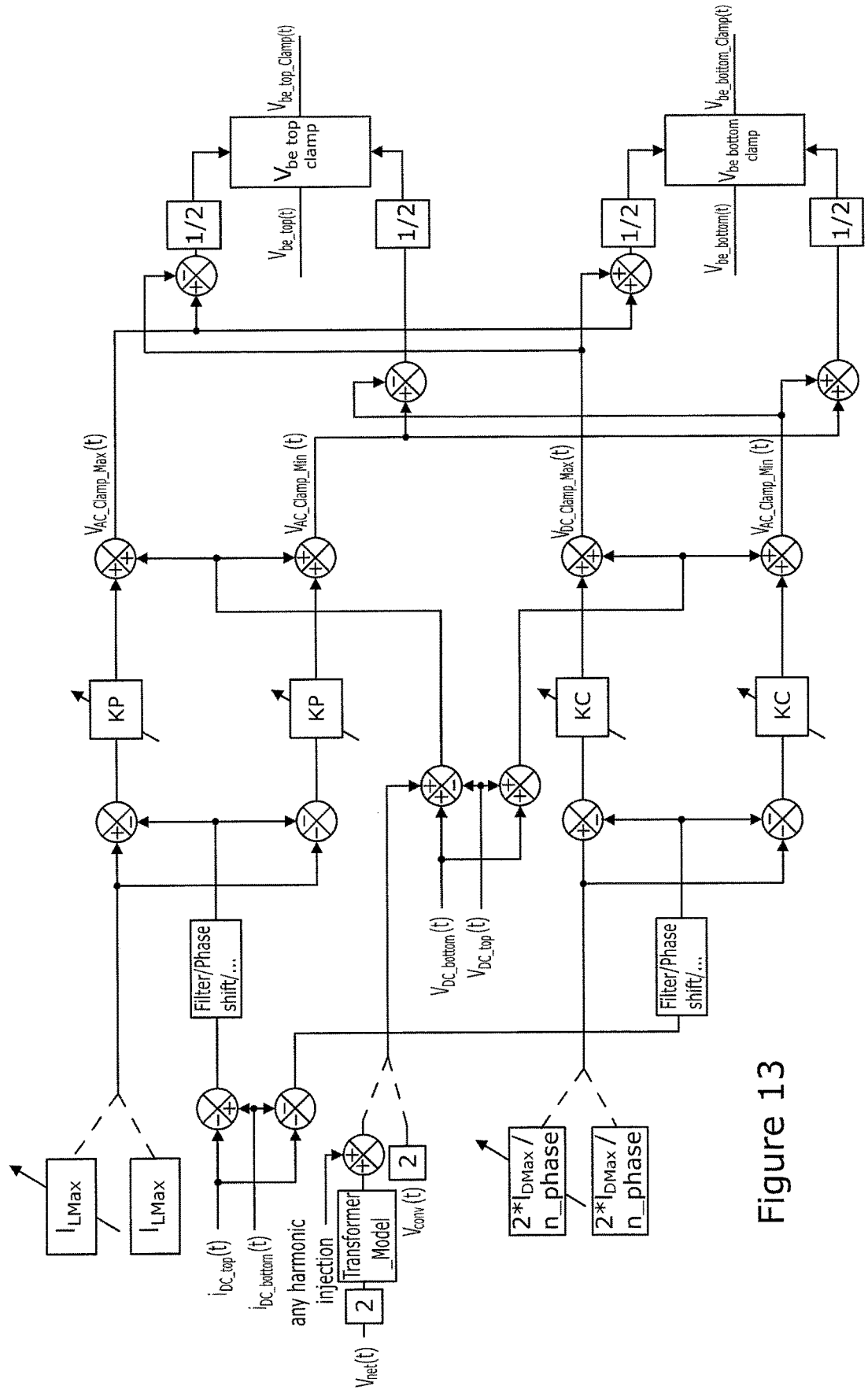
FIG. 13 shows a fourth topology of the controller.

FIG. 13 shows a fourth topology of the controller 62, which is programmed to generate values $V_{AC\_Clamp}$, $V_{DC\_Clamp}$ of the clamping voltages at the third terminal 42 and across the first and second DC terminals 32,34 required to limit the current $i_{L\_transf}$ flowing into the phase limb 36 and the current flowing in the phase limb 36 at or below a respective current threshold $I_{Lmax}, 2^*I_{DC\_Max}/\text{n\_phase}$ in accordance with the following equations:

$$2 \cdot V_{conv} + L_{Limb} \cdot \left(\frac{di_{DC\_bottom}}{dt} - \frac{di_{DC\_top}}{dt}\right) - V_{DC\_top} + V_{DC\_bottom} =$$
$$V_{bottom\_valve} - V_{top\_valve}$$

$$L_{Limb} \cdot \left(\frac{di_{DC\_top}}{dt} + \frac{di_{DC\_bottom}}{dt}\right) + V_{DC\_top} + V_{DC\_bottom} =$$
$$V_{bottom\_valve} + V_{top\_valve}$$

$$\begin{bmatrix} V_{bottom\_valve} - V_{top\_valve} \\ V_{bottom\_valve} + V_{top\_valve} \end{bmatrix} = \begin{bmatrix} 2 \cdot V_{conv} \\ 0 \end{bmatrix} +$$

$$\begin{bmatrix} V_{DC\_bottom} & -V_{DC\_top} \\ V_{DC\_bottom} & V_{DC\_top} \end{bmatrix} + L_{Limb} \cdot \frac{d}{dt} \cdot \begin{bmatrix} i_{DC\_bottom} & -i_{DC\_top} \\ i_{DC\_bottom} & i_{DC\_top} \end{bmatrix}$$

$$\begin{bmatrix} V_{bottom\_valve} - V_{top\_valve} \\ V_{bottom\_valve} + V_{top\_valve} \end{bmatrix}_{Clamp} =$$

$$\begin{bmatrix} 2 \cdot V_{conv} \\ 0 \end{bmatrix}_{Meas/Est/Obs} + \begin{bmatrix} V_{DC\_bottom} & -V_{DC\_top} \\ V_{DC\_bottom} & V_{DC\_top} \end{bmatrix}_{Meas/Est/Obs} -$$

$$KP \cdot \begin{bmatrix} i_{DC\_bottom} & -i_{DC\_top} \\ i_{DC\_bottom} & i_{DC\_top} \end{bmatrix}_{Meas/Est/Obs} +$$

$$KP \cdot \begin{bmatrix} I_{LMax} \\ 2 \cdot \frac{I_{DC\_MAx}}{\text{n\_phase}} \end{bmatrix}_{Limiter}$$

$$\begin{bmatrix} V_{AC} \\ V_{DC} \end{bmatrix}_{Clamp} = \begin{bmatrix} 2 \cdot V_{conv} \\ 0 \end{bmatrix}_{Meas/Est/Obs} + \begin{bmatrix} V_{DC\_bottom} & -V_{DC\_top} \\ V_{DC\_bottom} & V_{DC\_top} \end{bmatrix}_{Meas/Est/Obs} -$$

$$KP \cdot \begin{bmatrix} i_{DC\_bottom} & -i_{DC\_top} \\ i_{DC\_bottom} & i_{DC\_top} \end{bmatrix}_{Meas/Est/Obs} +$$

$$KP \cdot \begin{bmatrix} I_{LMax} \\ 2 \cdot \frac{I_{DC\_MAx}}{\text{n\_phase}} \end{bmatrix}_{Limiter}$$

$$\begin{bmatrix} V_{be\_top} \\ V_{be\_bottom} \end{bmatrix}_{Clamp} = \frac{1}{2} \cdot \begin{bmatrix} V_{AC} & -V_{DC} \\ V_{AC} & V_{DC} \end{bmatrix}_{Clamp}$$

The fourth topology of the controller 62 is a combination of the first topology of the controller 62 shown in FIG. 9 and the third topology of the controller 62 shown in FIG. 12.

In this manner, as shown in FIG. 13, the controller 62 generates the AC and DC clamping voltage values $V_{AC\_Clamp}$, $V_{DC\_Clamp}$ at the third terminal 42 and across the first and second DC terminals 32,34 required to limit the current $i_{L\_transf}$ flowing into the phase limb 36 and the current flowing in the phase limb 36 at or below the respective current threshold $I_{Lmax}, 2^*I_{DC\_Max}/\text{n\_phase}$. The controller 62 is programmed to generate a respective clamping voltage order signal $V_{be\_top\_Clamp}$, $V_{be\_bottom\_Clamp}$ for operating each valve 58 to clamp an AC voltage at the third terminal 42 at the AC clamping voltage value $V_{AC\_Clamp}$ and to clamp a DC voltage at the third terminal 42 at the DC clamping voltage value $V_{DC\_Clamp}$. In this manner, the controller is programmed to operate each valve 58 as a current limiter to limit the current $i_{L\_transf}$ flowing into the phase limb 36 and the current flowing in the phase limb 36 at or below a respective current threshold $I_{Lmax}, 2^*I_{DC\_Max}/\text{n\_phase}$.

Example 5

Figure 14:
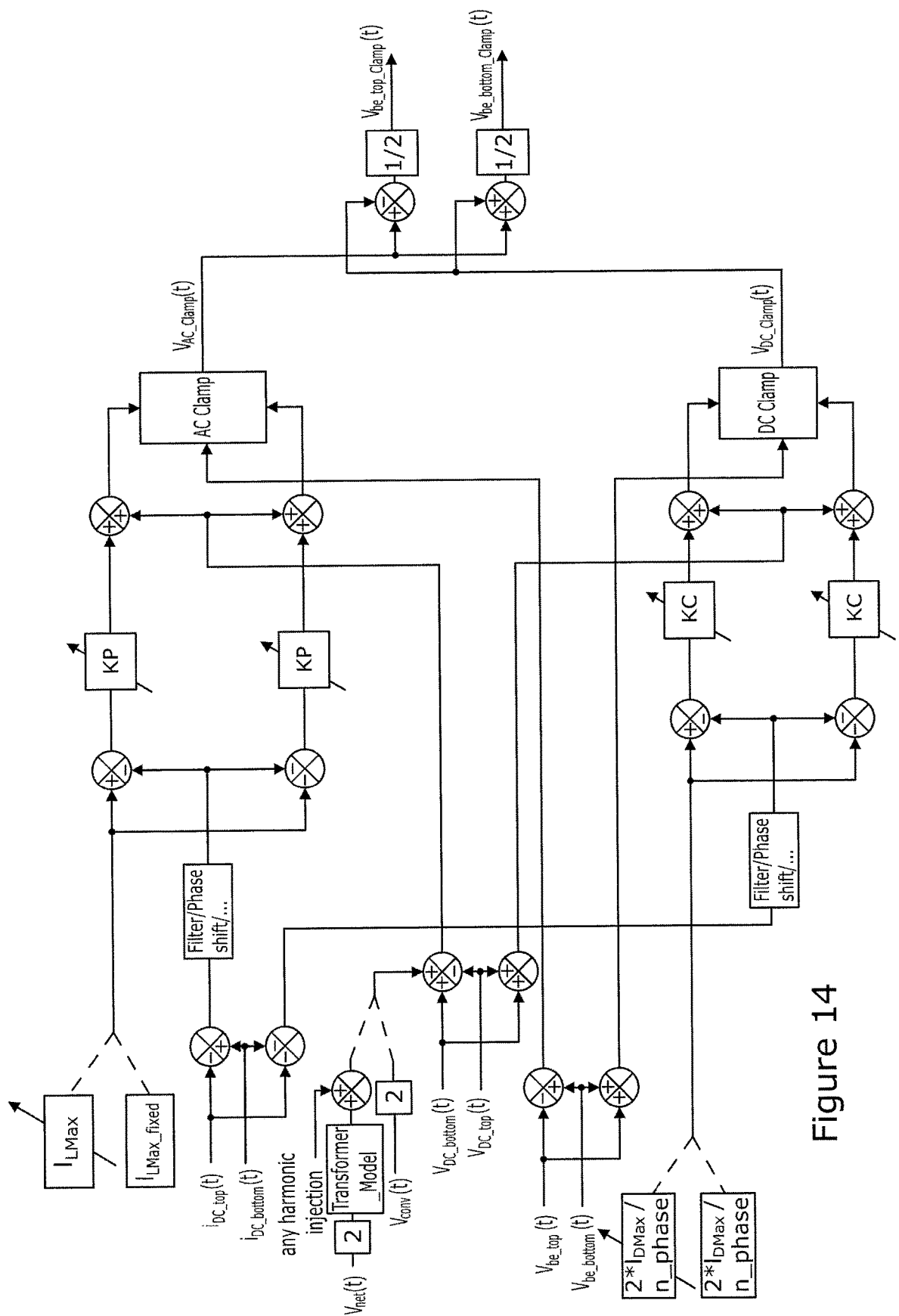
FIG. 14 shows a fifth topology of the controller.

FIG. 14 shows a fifth topology of the controller 62, which is programmed to generate values $V_{AC\_Clamp}$, $V_{DC\_Clamp}$ of the clamping voltages at the third terminal 42 and across the first and second DC terminals 32,34 required to limit the current $i_{L\_transf}$ flowing into the phase limb 36 and the current flowing in the phase limb 36 at or below a respective current threshold $I_{Lmax}, 2^*I_{DC\_Max}/\text{n\_phase}$ in accordance with the following equations:

$$2 \cdot V_{conv} + L_{Limb} \cdot \left(\frac{di_{DC\_bottom}}{dt} - \frac{di_{DC\_top}}{dt}\right) - V_{DC\_top} + V_{DC\_bottom} =$$
$$V_{bottom\_valve} - V_{top\_valve}$$

$$L_{Limb} \cdot \left(\frac{di_{DC\_top}}{dt} + \frac{di_{DC\_bottom}}{dt}\right) + V_{DC\_top} + V_{DC\_bottom} =$$
$$V_{bottom\_valve} + V_{top\_valve}$$

$$\begin{bmatrix} V_{bottom\_valve} - V_{top\_valve} \\ V_{bottom\_valve} + V_{top\_valve} \end{bmatrix} = \begin{bmatrix} 2 \cdot V_{conv} \\ 0 \end{bmatrix} +$$

$$\begin{bmatrix} V_{DC\_bottom} & -V_{DC\_top} \\ V_{DC\_bottom} & V_{DC\_top} \end{bmatrix} + L_{Limb} \cdot \frac{d}{dt} \cdot \begin{bmatrix} i_{DC\_bottom} & -i_{DC\_top} \\ i_{DC\_bottom} & i_{DC\_top} \end{bmatrix}$$

$$\begin{bmatrix} V_{bottom\_valve} - V_{top\_valve} \\ V_{bottom\_valve} + V_{top\_valve} \end{bmatrix}_{Clamp} =$$

$$\begin{bmatrix} 2 \cdot V_{conv} \\ 0 \end{bmatrix}_{Meas/Est/Obs} + \begin{bmatrix} V_{DC\_bottom} & -V_{DC\_top} \\ V_{DC\_bottom} & V_{DC\_top} \end{bmatrix}_{Meas/Est/Obs} -$$

$$KP \cdot \begin{bmatrix} i_{DC\_bottom} & -i_{DC\_top} \\ i_{DC\_bottom} & i_{DC\_top} \end{bmatrix}_{Meas/Est/Obs} +$$

$$KP \cdot \begin{bmatrix} I_{LMax} \\ 2 \cdot \frac{I_{DC\_MAx}}{\text{n\_phase}} \end{bmatrix}_{Limiter}$$

$$\begin{bmatrix} V_{AC} \\ V_{DC} \end{bmatrix}_{Clamp} = \begin{bmatrix} 2 \cdot V_{conv} \\ 0 \end{bmatrix}_{Meas/Est/Obs} + \begin{bmatrix} V_{DC\_bottom} & -V_{DC\_top} \\ V_{DC\_bottom} & V_{DC\_top} \end{bmatrix}_{Meas/Est/Obs} -$$

$$KP \cdot \begin{bmatrix} i_{DC\_bottom} & -i_{DC\_top} \\ i_{DC\_bottom} & i_{DC\_top} \end{bmatrix}_{Meas/Est/Obs} +$$

$$KP \cdot \begin{bmatrix} I_{LMax} \\ 2 \cdot \frac{I_{DC\_MAx}}{\text{n\_phase}} \end{bmatrix}_{Limiter}$$

$$\begin{bmatrix} V_{be\_top} \\ V_{be\_bottom} \end{bmatrix}_{Clamp} = \frac{1}{2} \cdot \begin{bmatrix} V_{AC} & -V_{DC} \\ V_{AC} & V_{DC} \end{bmatrix}_{Clamp}$$

The fifth topology in FIG. 14 differs from the fourth topology in FIG. 13 in that the fifth topology of the controller 62 is a combination of the second topology of the controller 62 shown in FIG. 11 and the third topology of the controller 62 shown in FIG. 12. Hence, the controller 62 is programmed to generate the clamping voltage values $V_{AC\_Clamp}$, $V_{DC\_Clamp}$ by processing the AC voltage $V_{conv}$ at the third terminal 42, instead of the AC voltage $V_{net}$ of the AC electrical network 46.

In this manner, as shown in FIG. 14, the controller 62 generates the AC and DC clamping voltage values $V_{AC\_Clamp}$, $V_{DC\_Clamp}$ at the third terminal 42 and across the first and second DC terminals 32,34 required to limit the current $i_{L\_transf}$ flowing into the phase limb 36 and the current flowing in the phase limb 36 at or below the respective current threshold $I_{Lmax}$,$2*I_{DC\_Max}$/n_phase. The controller 62 is programmed to generate a respective clamping voltage order signal $V_{be\_top\_Clamp}$, $V_{be\_bottom\_Clamp}$ for operating each valve 58 to clamp an AC voltage at the third terminal 42 at the AC clamping voltage value $V_{AC\_Clamp}$ and to clamp a DC voltage at the third terminal 42 at the DC clamping voltage value $V_{DC\_Clamp}$. In this manner, the controller is programmed to operate each valve 58 as a current limiter to limit the current $i_{L\_transf}$ flowing into the phase limb 36 and the current flowing in the phase limb 36 at or below a respective current threshold $I_{Lmax}$,$2*I_{DC\_Max}$/n_phase.

Example 6

Figure 15:
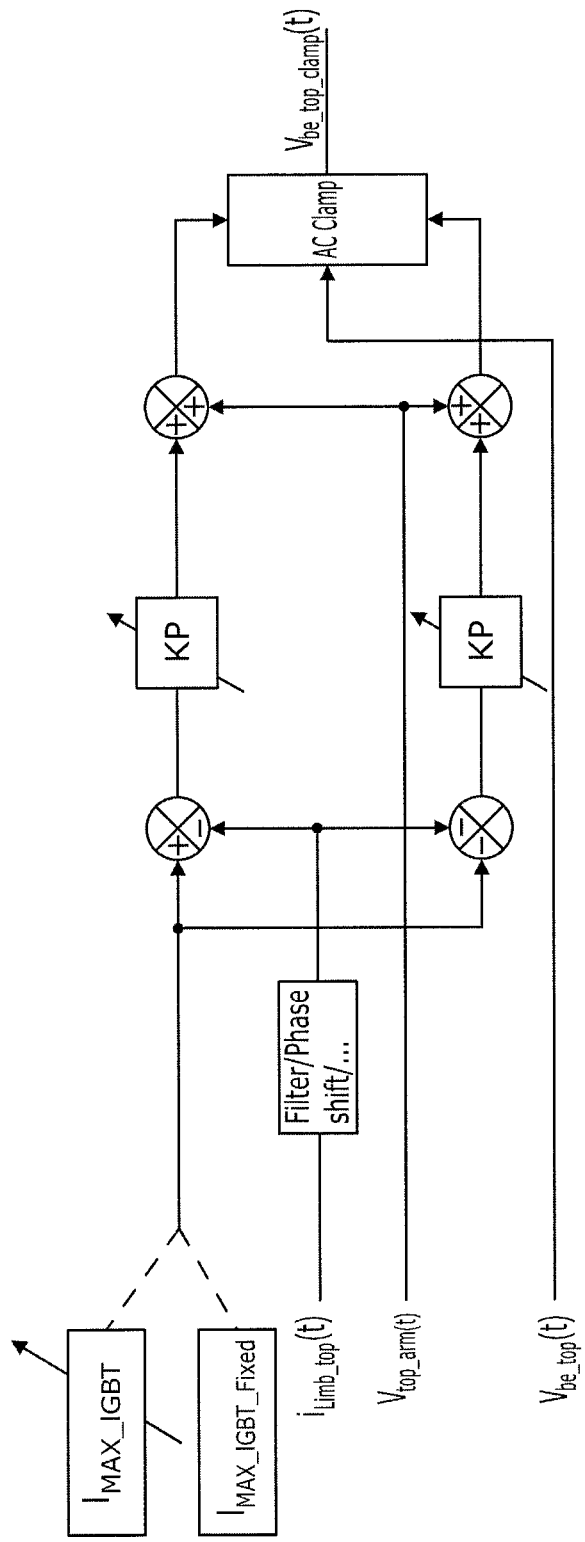
FIGS. 15 and 16 show in combination a sixth topology of the controller.
Figure 16:
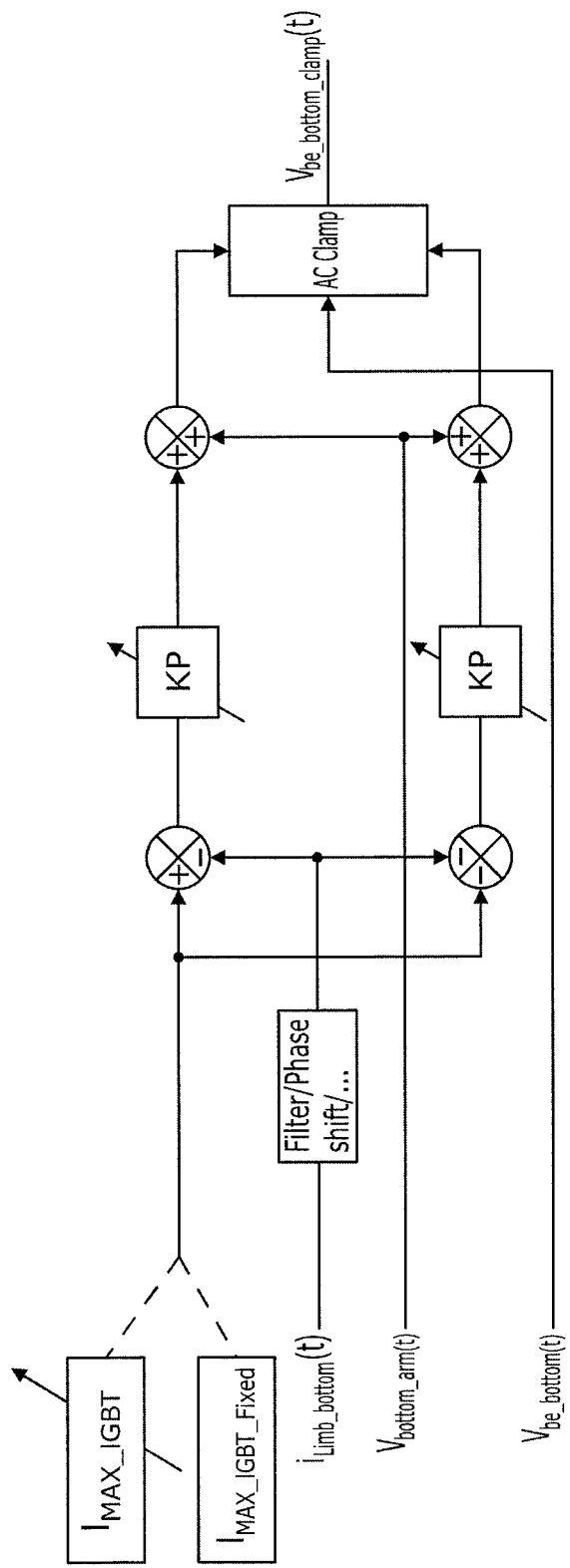
Figure 17:
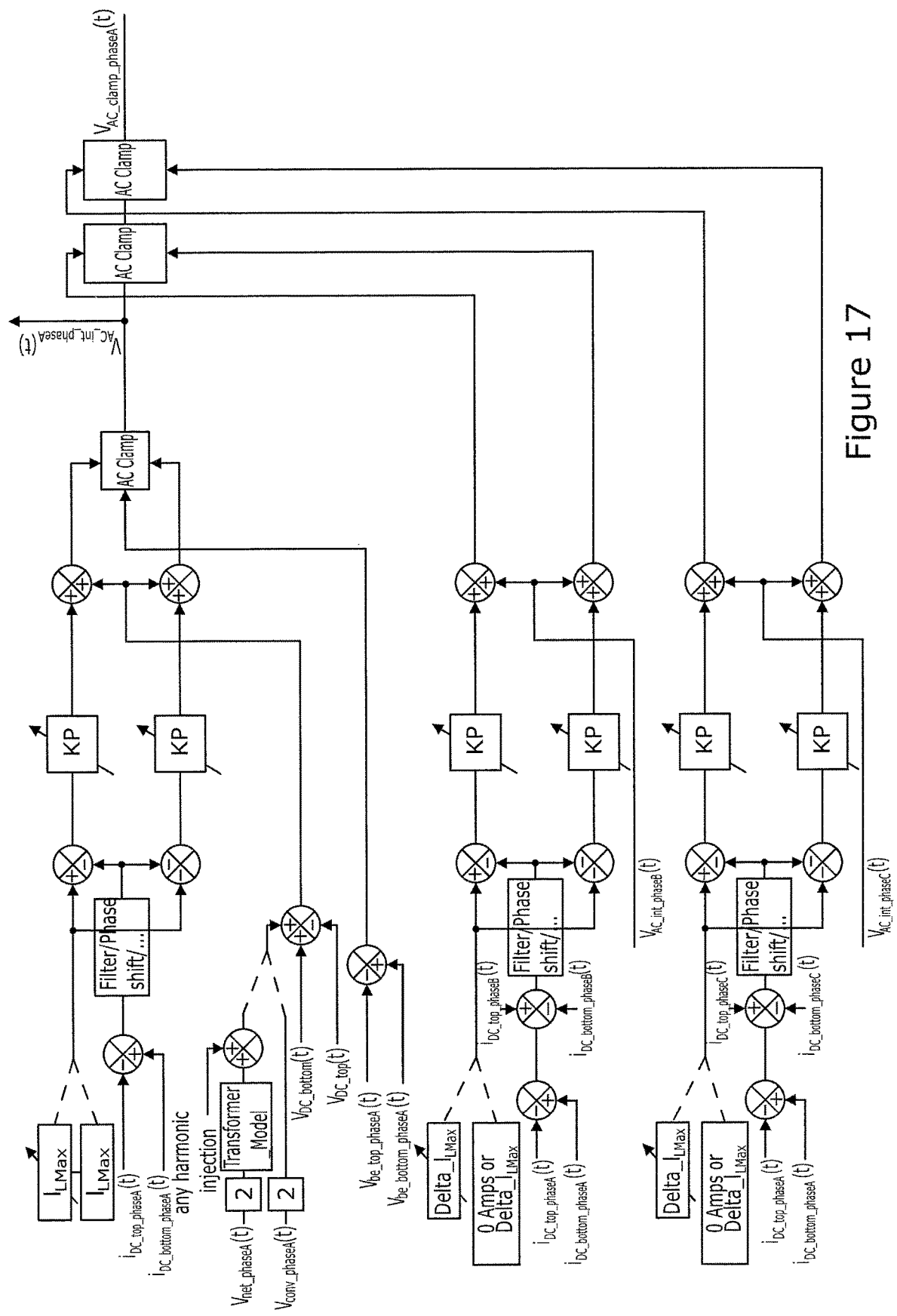
FIGS. 17 to 20 show in combination a seventh topology of the controller.

FIGS. 15 and 16 show in combination a sixth topology of the controller 62, which is programmed to generate a value $V_{AC\_Clamp}$ of the clamping voltage at the third terminal 42 to limit a respective current $i_{DC\_top}$, $i_{DC\_bottom}$ flowing in each converter arm 38,40 at or below a current threshold $I_{MAX\_IGBT}$, in accordance with the following equations:

$$V_{top\_arm} + V_{bottom\_arm} =$$
$$V_{top\_valve} - L_{Limb} \cdot \frac{di_{DC\_top}}{dt} + V_{bottom\_arm} - L_{Limb} \cdot \frac{di_{DC\_bottom}}{dt}$$

$$V_{top\_arm} = V_{top\_valve} - L_{Limb} \cdot \frac{di_{DC\_top}}{dt}$$

$$V_{bottom\_arm} = V_{bottom\_valve} - L_{Limb} \cdot \frac{di_{DC\_top}}{dt}$$

$$V_{top\_arm} = V_{top\_valve} + KP \cdot (I_{MAX\_IGBT} - i_{Limb\_top})$$

$$V_{bottom\_arm} = V_{bottom\_valve} + KP \cdot (I_{MAX\_IGBT} - i_{Limb\_bottom})$$

$$i_{Limb\_top} = i_{L\_transf}/2 - i_{DC\_Bus}/\text{n\_phase}$$

$$i_{Limb\_bottom} = -i_{L\_transf}/2 + i_{DC\_Bus}/\text{n\_phase}$$

In this manner, as shown in FIGS. 15 and 16, the controller 62 generate the clamping voltage value $V_{AC\_Clamp}$ at the third terminal 42 required to limit a respective current $i_{DC\_top}$, $I_{DC\_bottom}$ flowing in each converter arm 38,40 at or below a current threshold $I_{MAX\_IGBT}$. The controller 62 is programmed to generate a respective clamping voltage order signal $V_{be\_top\_Clamp}$, $V_{be\_bottom\_Clamp}$ for operating each valve 58 to clamp an AC voltage at the third terminal 42 at the AC clamping voltage value $V_{AC\_Clamp}$. In this manner the controller is programmed to operate each valve 58 as a current limiter to limit a respective current $i_{DC\_top}$, $I_{DC\_bottom}$ flowing in each converter arm 38,40 at or below a current threshold $I_{MAX\_IGBT}$.

Example 7

FIGS. 17 to 20 show in combination a seventh topology of the controller 62, which is programmed to generate values of the respective clamping voltages $V_{AC\_Clamp\_phaseA}$, $V_{AC\_Clamp\_phaseB}$, $V_{AC\_Clamp\_phaseC}$ at the third terminals 42 required to limit the current circulating between the plurality of phase limbs 36 at or below a current threshold Delta_$I_{Lmax}$ in accordance with the following equations:

$$i_{DC\_top} = i_{L\_transf}/2 + i_{DC\_Bus}/\text{n\_phase}$$

$$i_{DC\_bottom} = -i_{L\_transf}/2 + i_{DC\_Bus}/\text{n\_phase}$$

$$i_{DC\_bottomA} - i_{DC\_topA} = -i_{LA\_transf}$$

$$-i_{DC\_bottomB} + i_{DC\_topB} = i_{LB\_transf}$$

$$-i_{DC\_bottomC} + i_{DC\_topC} = i_{LC\_transf}$$

$$V_{AC\_Clamp\_phaseA\_up1}(t) = (\text{Delta}\_I_{LMAX} - (-i_{LA\_transf} + i_{LB\_Transf})) * KP + V_{AC\_int\_phaseB}(t)$$

$$V_{AC\_Clamp\_phaseA\_down1}(t) = (-\text{Delta}\_I_{LMAX} - (-i_{LA\_transf} + i_{LB\_Transf})) * KP + V_{AC\_int\_phaseB}(t)$$

$$V_{AC\_Clamp\_phaseA\_up2}(t) = (\text{Delta}\_I_{LMAX} - (-i_{LA\_transf} + i_{LC\_Transf})) * KP + V_{AC\_int\_phaseC}(t)$$

$$V_{AC\_Clamp\_phaseA\_down2}(t) = (-\text{Delta}\_I_{LMAX} - (-i_{LA\_transf} + i_{LC\_Transf})) * KP + V_{AC\_int\_phaseC}(t)$$

$$V_{AC\_Clamp\_phaseA\_Minup}(t) = \{VAC\_\text{Clamp\_phase}A\_up1, VAC\_\text{Clamp\_phase}A\_up2\}$$

$$V_{AC\_Clamp\_phaseA\_Mindown}(t) = \{VAC\_\text{Clamp\_phase}A\_down1, VAC\_\text{Clamp\_phase}A\_down2\}$$

$$V_{AC\_Clamp\_phaseB\_up1}(t) = (\text{Delta}\_I_{LMAX} - (-i_{LB\_transf} + i_{LC\_Transf})) * KP + V_{AC\_int\_phaseC}(t)$$

$$V_{AC\_Clamp\_phaseB\_down1}(t) = (-\text{Delta}\_I_{LMAX} - (-i_{LB\_transf} + i_{LC\_Transf})) * KP + V_{AC\_int\_phaseC}(t)$$

$$V_{AC\_Clamp\_phaseB\_up2}(t) = (\text{Delta}\_I_{LMAX} - (-i_{LB\_transf} + i_{LA\_Transf})) * KP + V_{AC\_int\_phaseA}(t)$$

$$V_{AC\_Clamp\_phaseB\_down2}(t) = (-\text{Delta}\_I_{LMAX} - (-i_{LB\_transf} + i_{LA\_Transf})) * KP + V_{AC\_int\_phaseA}(t)$$

$$V_{AC\_Clamp\_phaseB\_Minup}(t) = \{VAC\_\text{Clamp\_phase}B\_up1, VAC\_\text{Clamp\_phase}B\_up2\}$$

$$V_{AC\_Clamp\_phaseB\_Mindown}(t) = \{VAC\_\text{Clamp\_phase}B\_down1, VAC\_\text{Clamp\_phase}B\_down2\}$$

$$V_{AC\_Clamp\_phaseC\_up1}(t) = (\text{Delta}\_I_{LMAX} - (-i_{LC\_transf} + i_{LA\_Transf})) * KP + V_{AC\_int\_phaseA}(t)$$

$$V_{AC\_Clamp\_phaseC\_down1}(t) = (-\text{Delta}\_I_{LMAX} - (-i_{LC\_transf} + i_{LA\_Transf})) * KP + V_{AC\_int\_phaseA}(t)$$

$$V_{AC\_Clamp\_phaseC\_up2}(t) = (\text{Delta}\_I_{LMAX} - (-i_{LC\_transf} + i_{LB\_Transf})) * KP + V_{AC\_int\_phaseB}(t)$$

$$V_{AC\_Clamp\_phaseC\_down2}(t) = (-\text{Delta}\_I_{LMAX} - (-i_{LC\_transf} + i_{LB\_Transf})) * KP + V_{AC\_int\_phaseB}(t)$$

$$V_{AC\_Clamp\_phaseC\_Minup}(t) = \{VAC\_\text{Clamp\_phase}C\_up1, VAC\_\text{Clamp\_phase}C\_up2\}$$

$$V_{AC\_Clamp\_phaseC\_Mindown}(t) = \{VAC\_\text{Clamp\_phase}C\_down1, VAC\_\text{Clamp\_phase}C\_down2\}$$

where $V_{AC\_Clamp\_phaseA\_up}$ and $V_{AC\_Clamp\_phaseA\_down}$ together define the AC clamping voltage $V_{AC\_Clamp\_phaseA}$ at the third terminal 42 in respect of a first one of the phase limbs 36;

$V_{AC\_Clamp\_phaseB\_up}$ and $V_{AC\_Clamp\_phaseB\_down}$ together define the AC clamping voltage $V_{AC\_Clamp\_phaseB}$ at the third terminal 42 in respect of a second one of the phase limbs 36;

$V_{AC\_Clamp\_phaseC\_up}$ and $V_{AC\_Clamp\_phaseC\_down}$ together define the AC clamping voltage $V_{AC\_Clamp\_phaseC}$ at the third terminal 42 in respect of a third one of the phase limbs 36; $V_{AC\_int\_phaseA}$, $V_{AC\_int\_phaseB}$, and $V_{AC\_int\_phaseC}$ are the alternating currents circulating in the respective phase limbs 36.

Figure 18:
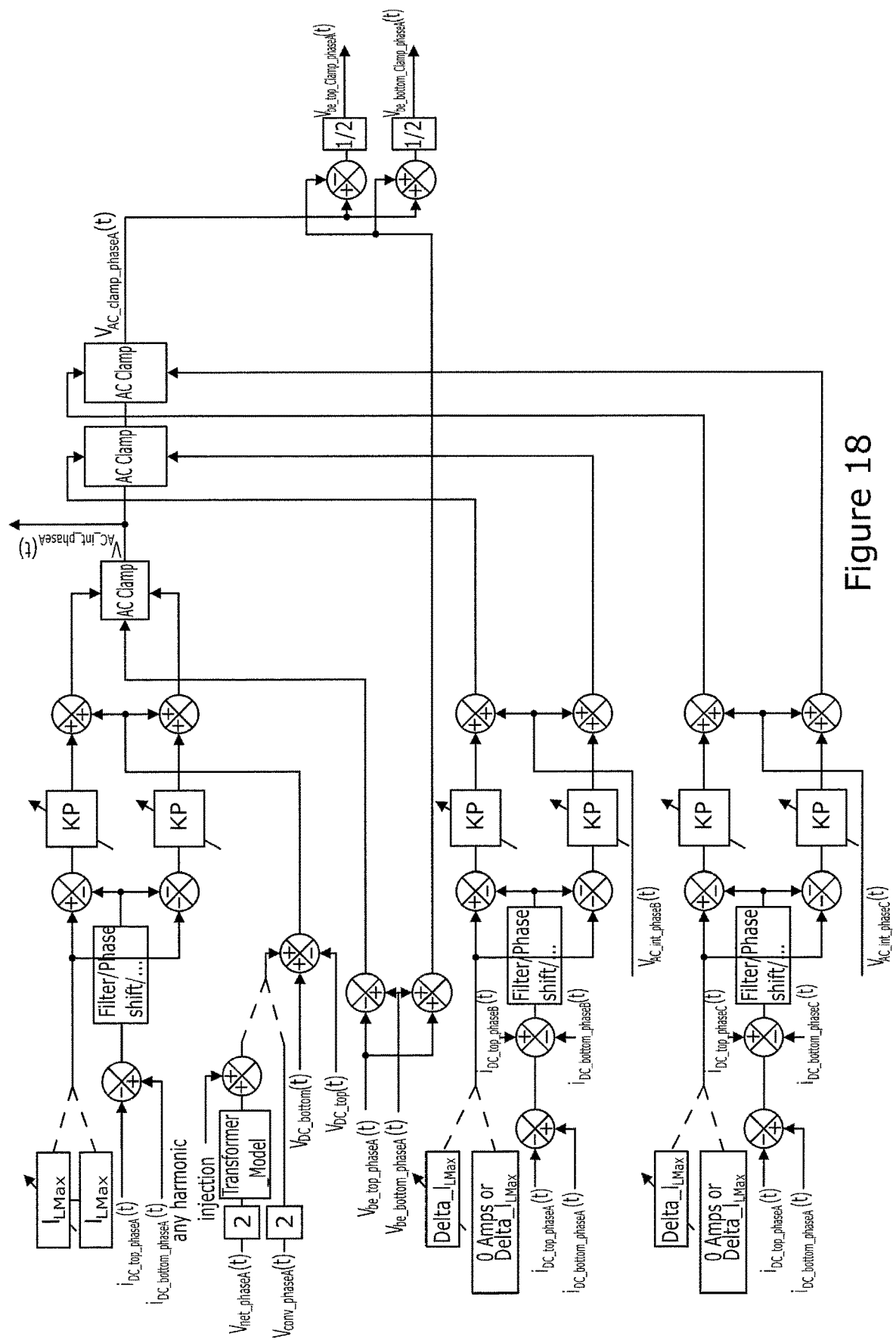
Figure 19:
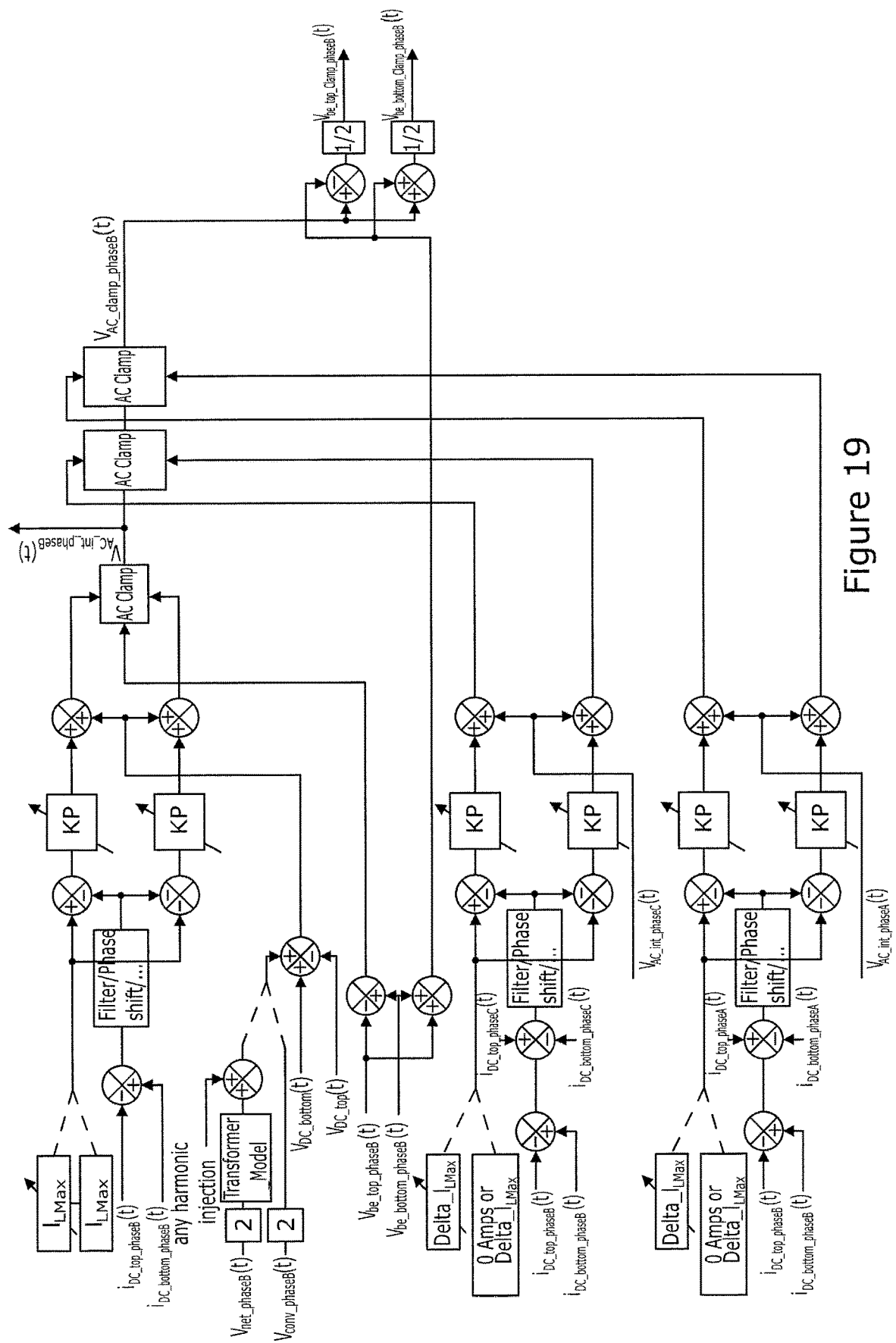
Figure 20:
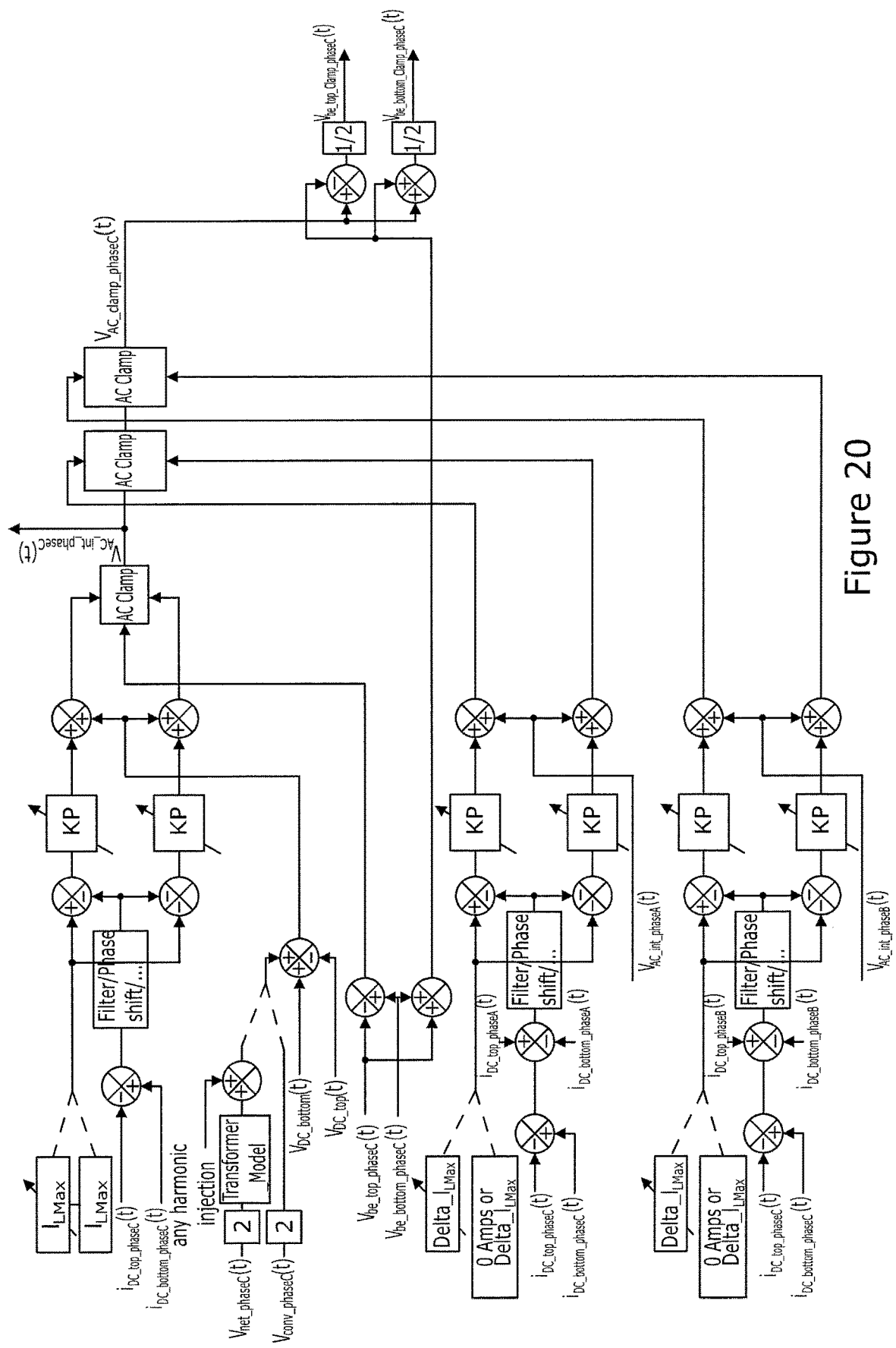

In this manner, as shown in FIGS. 17 to 20, the controller 62 generates the clamping voltage value $V_{AC\_Clamp}$ at each third terminal 42 required to limit the current circulating between the plurality of phase limbs 36 at or below a current threshold Delta_$I_{Lmax}$. As shown in FIGS. 18 to 20, the controller 62 is programmed to generate a respective clamping voltage order signal $V_{be\_top\_Clamp}$, $V_{be\_bottom\_Clamp}$ for operating each valve 58 to clamp an AC voltage at each third terminal 42 at the clamping voltage value $V_{AC\_Clamp}$. In this manner, the controller is programmed to operate each valve 58 as a current limiter to limit a selected current circulating between the plurality of phase limbs 36 at or below a current threshold Delta_$I_{Lmax}$.

Example 8

Figure 21:
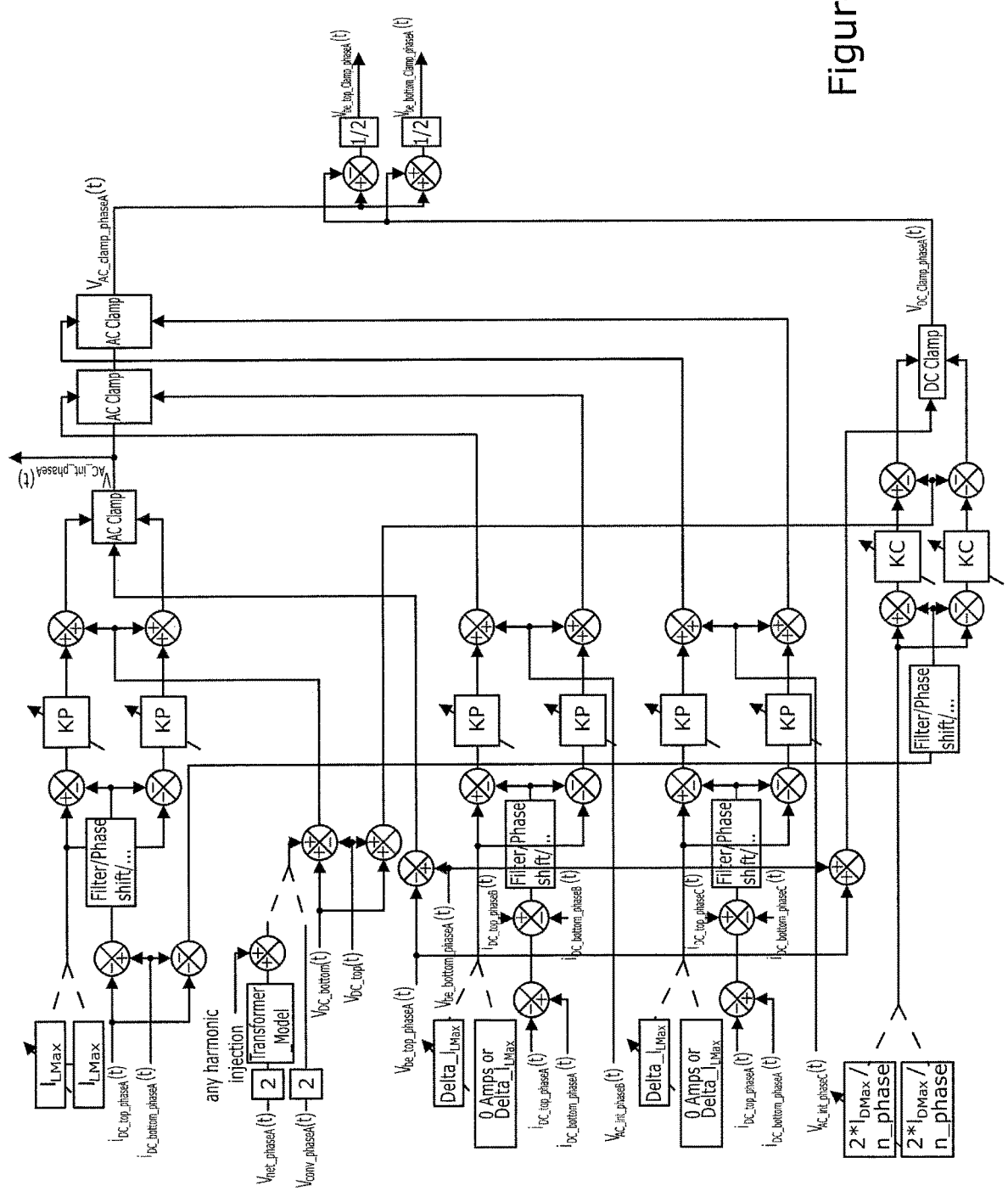
FIG. 21 shows an eighth topology of the controller.
Figure 22:
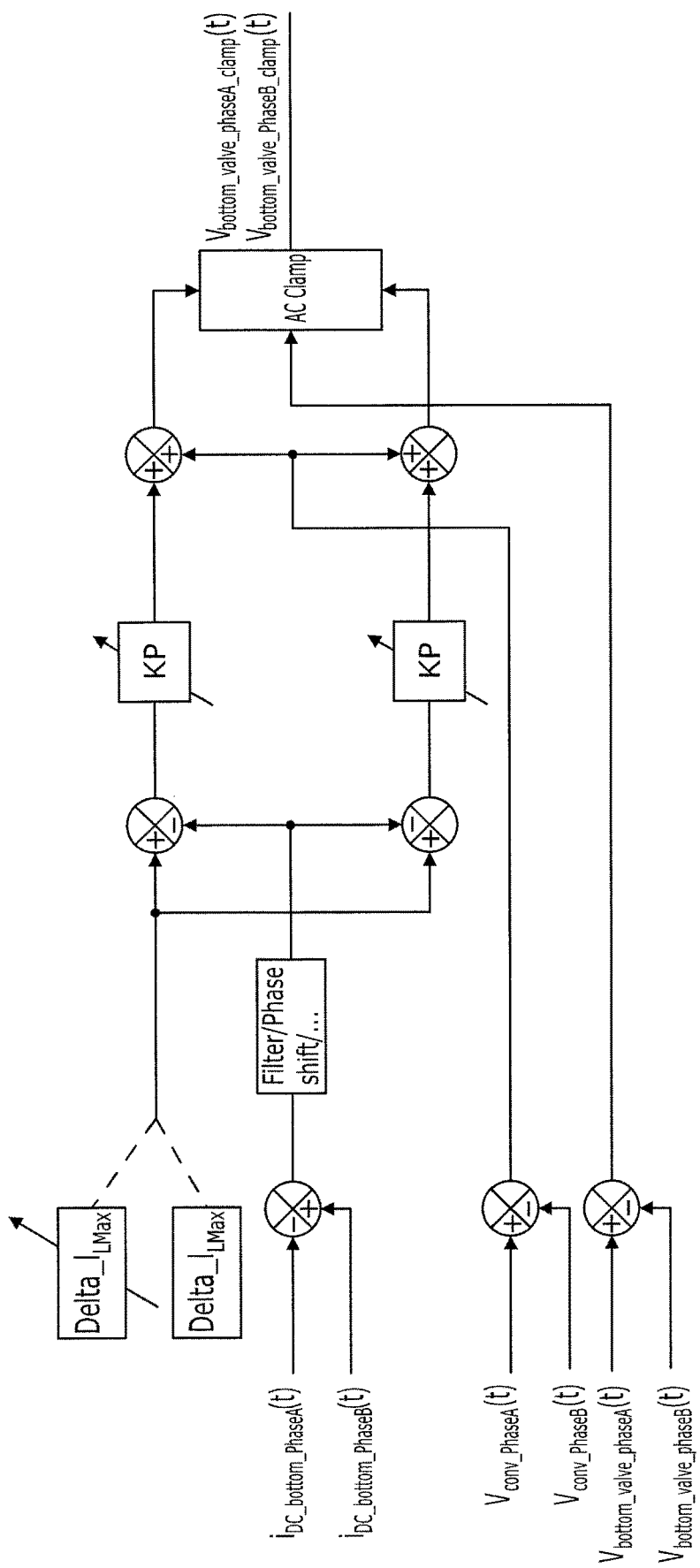
FIGS. 22 to 27 show in combination a ninth topology of the controller.
Figure 23:
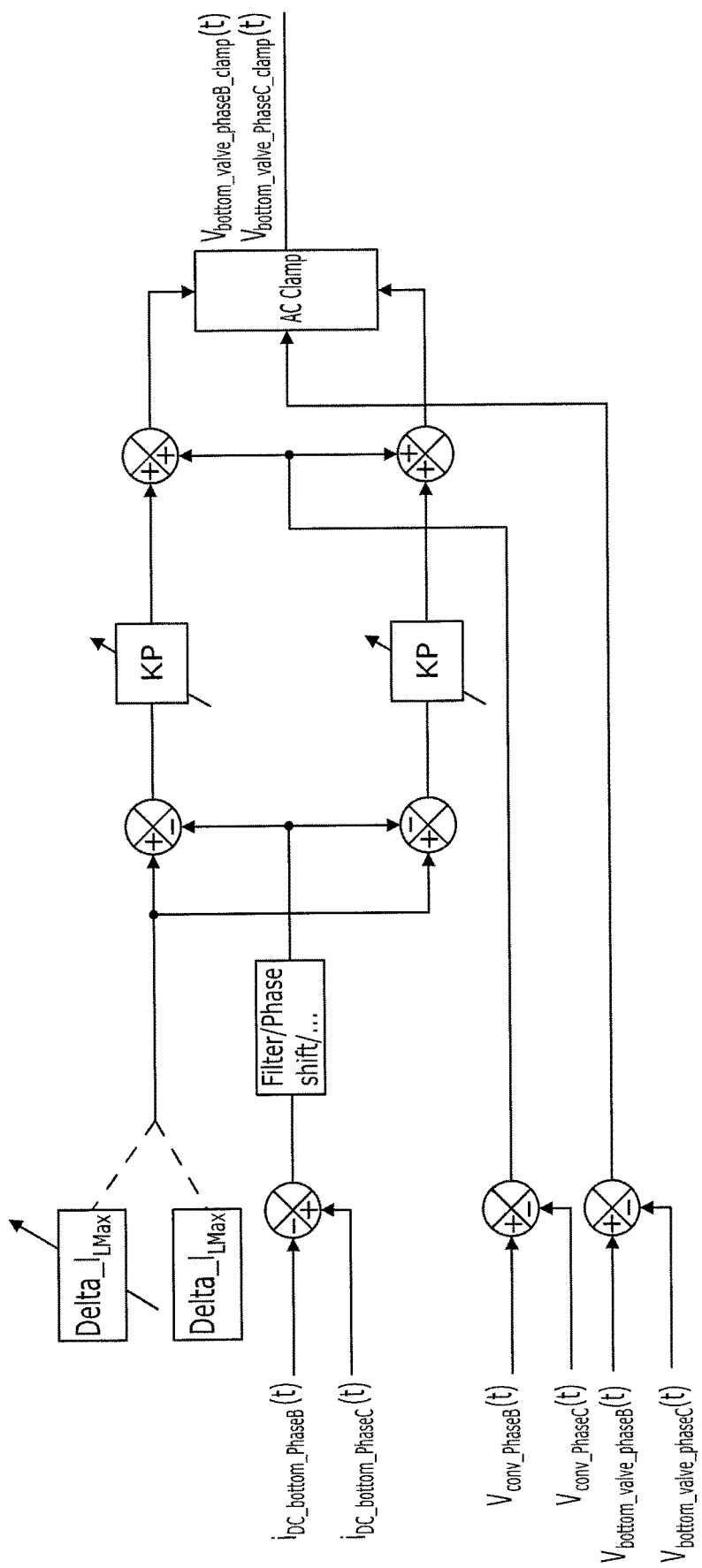
Figure 24:
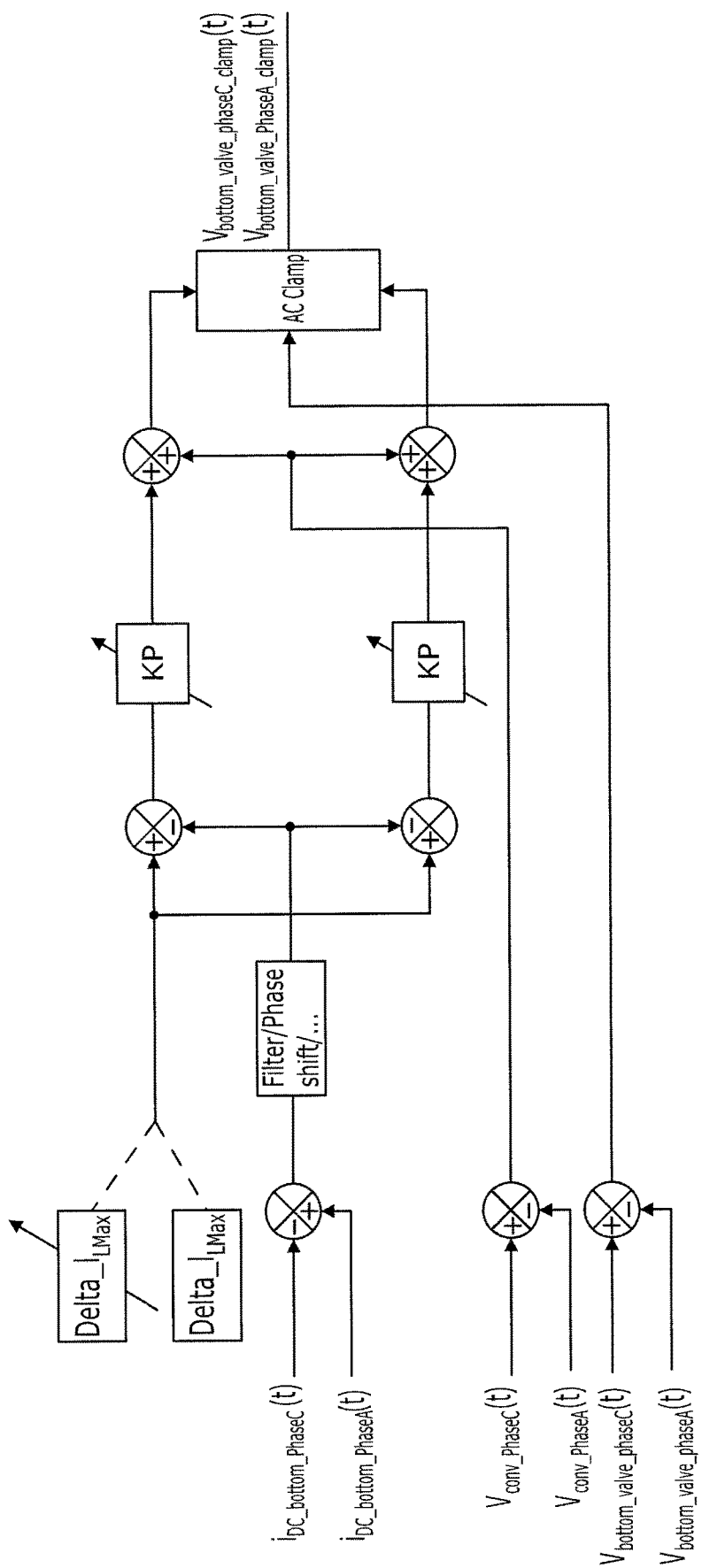
Figure 25:
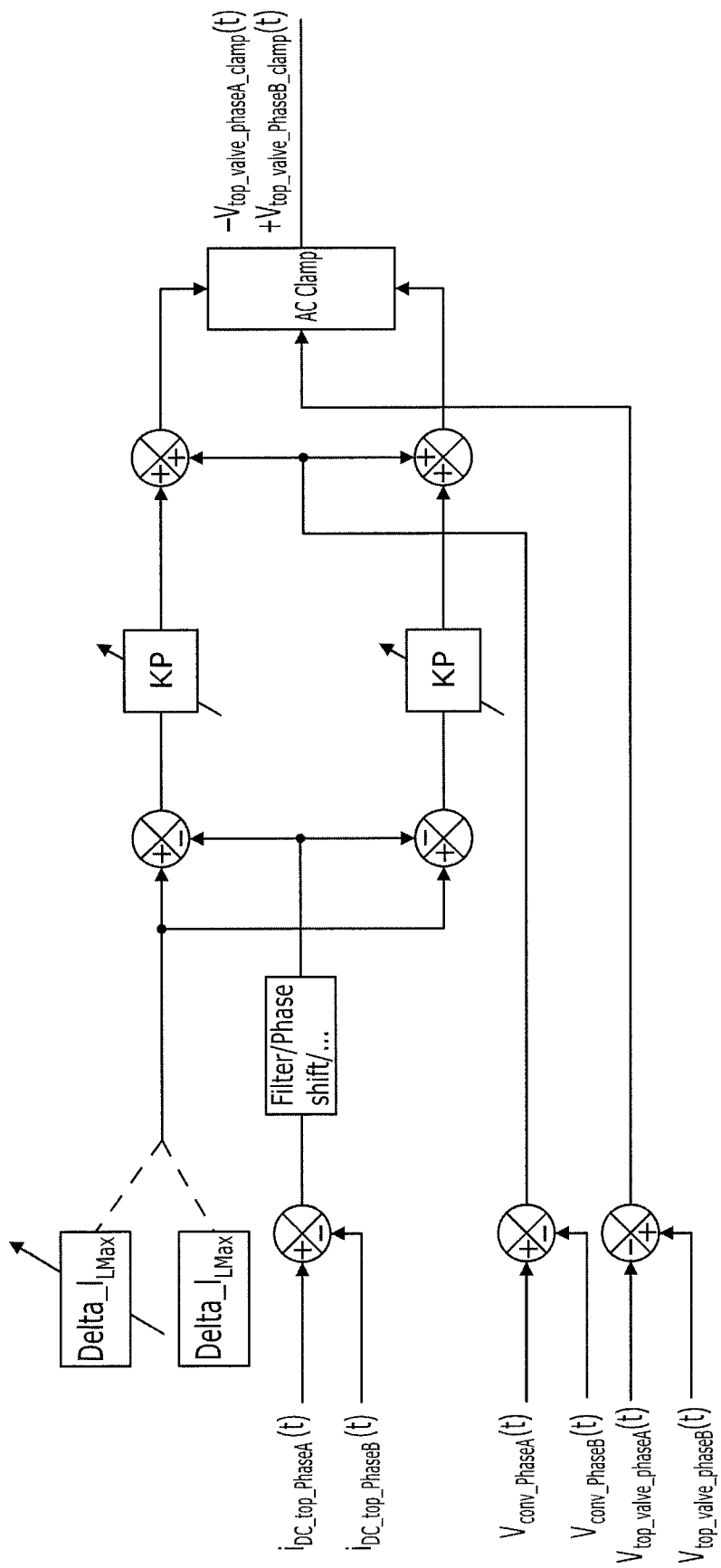
Figure 26:
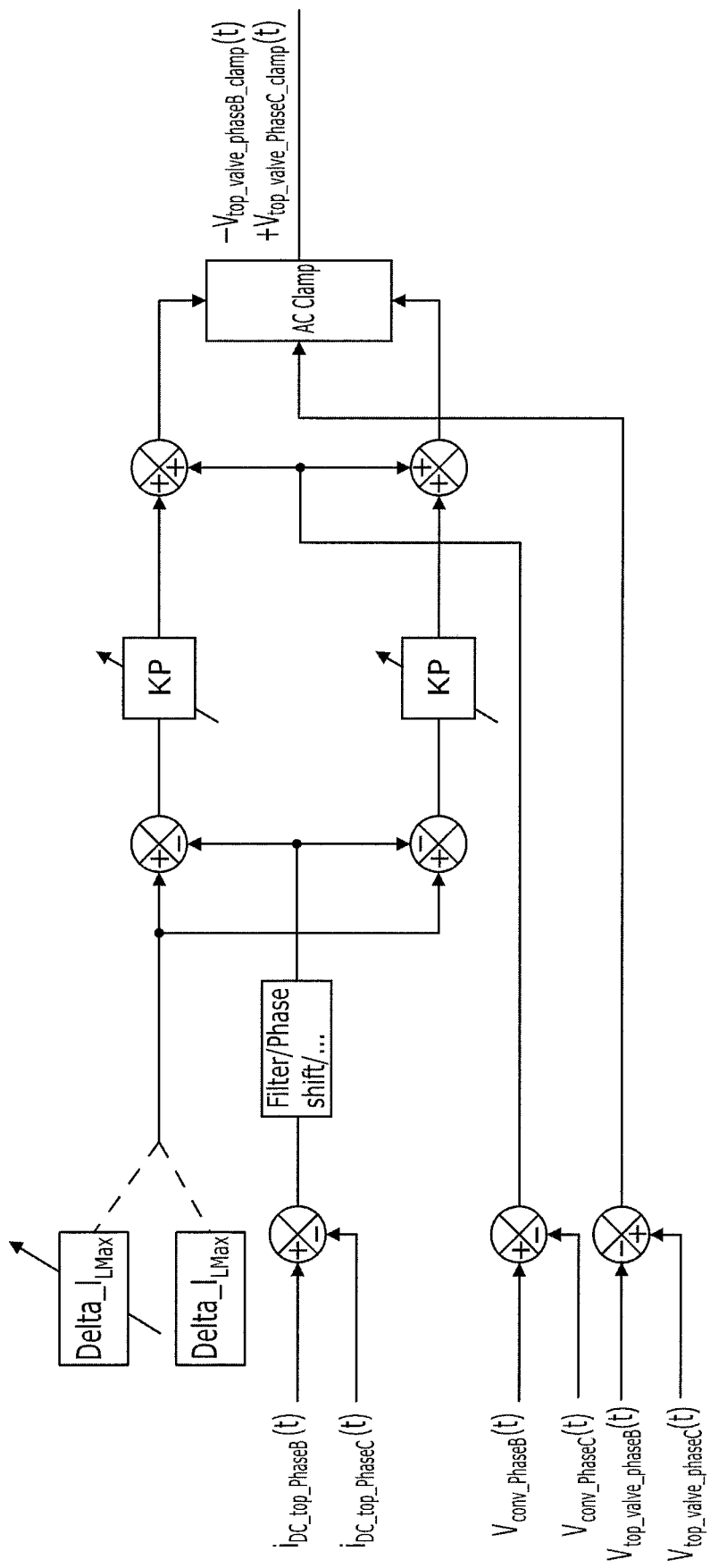
Figure 27:
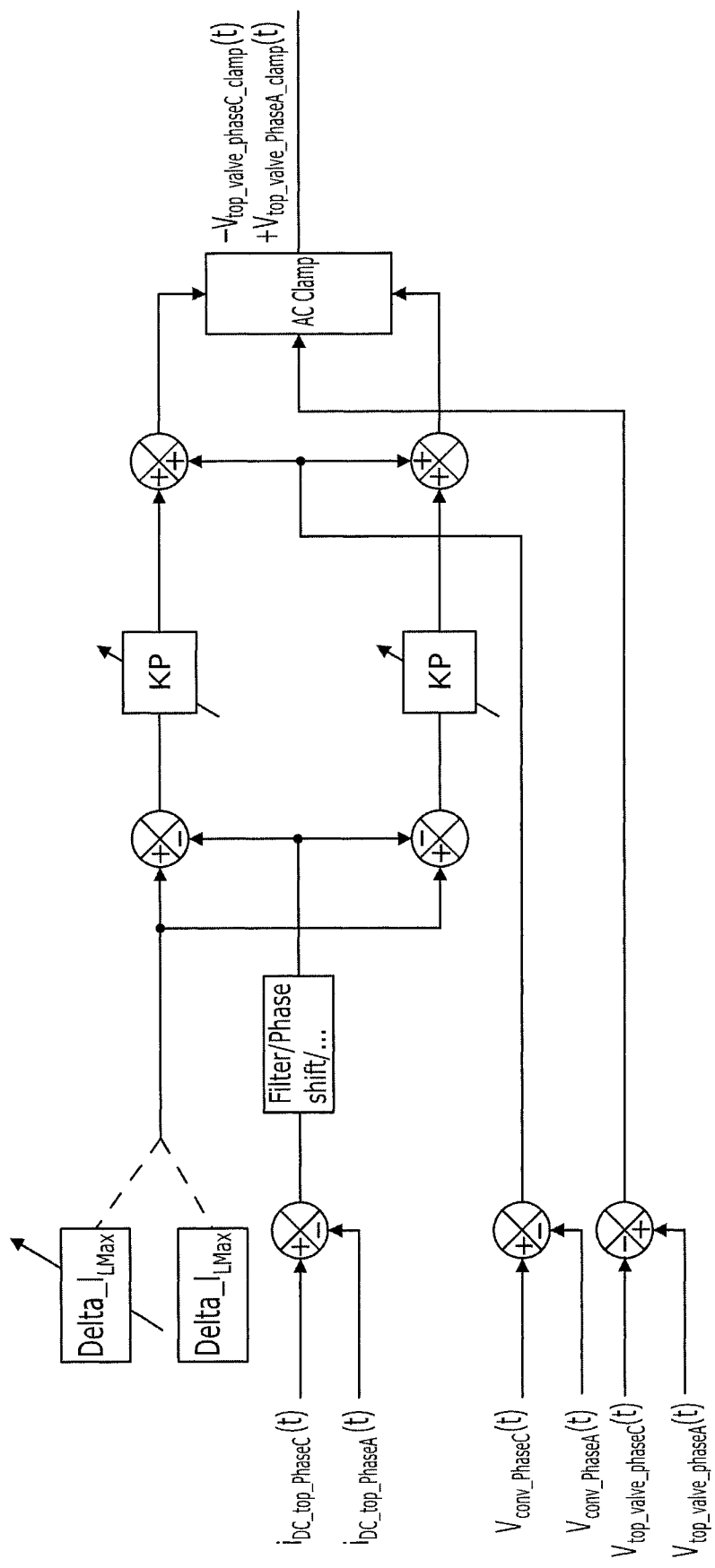

FIG. 21 shows an eighth topology of the controller 62, which is programmed to generate values of the respective clamping voltages $V_{AC\_Clamp\_phaseA}$, $V_{DC\_Clamp\_phaseA}$ at the third terminals 42 and across the first and second DC terminals 32, 34 required to limit the current circulating between the plurality of phase limbs 36 at or below a current threshold Delta_$I_{Lmax}$ in accordance with the following equations:

$$i_{DC\_top} = i_{L\_transf}/2 + i_{DC\_Bus}/\text{n\_phase}$$

$$i_{DC\_bottom} = -i_{L\_transf}/2 + i_{DC\_Bus}/\text{n\_phase}$$

$$i_{DC\_bottomA} - i_{DC\_topA} = -i_{LA\_transf}$$

$$-i_{DC\_bottomB} + i_{DC\_topB} = i_{LB\_transf}$$

$$-i_{DC\_bottomC} + i_{DC\_topC} = -i_{LC\_transf}$$

$$[V_{bottom\_valve\_phaseA}(t) + V_{top\_valve\_phaseA}(t)]_{Clamp} = V_{DC\_bottom}(t) +$$
$$V_{DC\_top}(t) + \left(\frac{2 \cdot I_{DC\_Max}}{\text{n\_phase}} - (i_{DC\_top} + i_{DC\_bottom})\right) \cdot KC$$

$$V_{DC\_Clamp\_phaseA} = \lfloor V_{bottom\_valve\_phaseA}(t) + V_{top\_valve\_phaseA}(t) \rfloor_{Clamp}$$

$$V_{AC\_Clamp\_phaseA\_up1}(t) =$$
$$(\text{Delta\_I}_{LMAX} - (-i_{LA\_transf} + i_{LB\_Transf}) * KP + V_{AC\_int\_phaseB}(t))$$

$$V_{AC\_Clamp\_phaseA\_down1}(t) = (-\text{Delta\_I}_{LMAX} -$$
$$(-i_{LA\_transf} + i_{LB\_Transf}) * KP + V_{AC\_int\_phaseB}(t))$$

$$V_{AC\_Clamp\_phaseA\_up2}(t) = (\text{Delta\_I}_{LMAX} - (-i_{LA\_transf} + i_{LC\_Transf}) * KP +$$
$$V_{AC\_int\_phaseC}(t))$$

$$V_{AC\_Clamp\_phaseA\_down2}(t) = (-\text{Delta\_I}_{LMAX} - (-i_{LA\_transf} + i_{LC\_Transf}) * KP +$$
$$V_{AC\_int\_phaseC}(t))$$

$$V_{AC\_Clamp\_phaseA\_Minup}(t) = \{VAC\_Clamp\_phaseA\_up1,$$
$$VAC\_Clamp\_phaseA\_up2\}$$

$$V_{AC\_Clamp\_phaseA\_Mindown}(t) = \{VAC\_Clamp\_phaseA\_down1,$$
$$VAC\_Clamp\_phaseA\_down2\}$$

Example 9

FIGS. 22 to 27 show in combination a ninth topology of the controller 62, which is programmed to generate values of the respective clamping voltages at the third terminals 42 required to limit the current circulating between the plurality of phase limbs 36 at or below a current threshold Delta_$I_{L\text{-}Max}$ in accordance with the following equations:

$$V_{conv\_phaseA} = -V_{DC\_bottom} + V_{bottom\_valve\_phaseA} - L_{Limb} \cdot \frac{di_{DC\_bottom\_phaseA}}{dt}$$

$$V_{conv\_phaseB} = -V_{DC\_bottom} + V_{bottom\_valve\_phaseB} - L_{Limb} \cdot \frac{di_{DC\_bottom\_phaseB}}{dt}$$

$$V_{conv\_phaseC} = -V_{DC\_bottom} + V_{bottom\_valve\_phaseC} - L_{Limb} \cdot \frac{di_{DC\_bottom\_phaseC}}{dt}$$

$$V_{conv\_phaseA} = -V_{DC\_top} - V_{top\_valve\_phaseA} + L_{Limb} \cdot \frac{di_{DC\_top\_phaseA}}{dt}$$

$$V_{conv\_phaseB} = V_{DC\_top} - V_{top\_valve\_phaseB} + L_{Limb} \cdot \frac{di_{DC\_top\_phaseB}}{dt}$$

$$V_{conv\_phaseC} = V_{DC\_top} - V_{top\_valve\_phaseC} + L_{Limb} \cdot \frac{di_{DC\_top\_phaseC}}{dt}$$

$$V_{conv\_phaseA} - V_{conv\_phaseB} = V_{bottom\_valve\_phaseA} -$$
$$V_{bottom\_valve\_phaseB} - L_{Limb} \cdot \left(\frac{di_{DC\_bottom\_phaseA}}{dt} - \frac{di_{DC\_bottom\_phaseB}}{dt}\right)$$

$$V_{conv\_phaseB} - V_{conv\_phaseC} = V_{bottom\_valve\_phaseB} - V_{bottom\_valve\_phaseC} -$$
$$L_{Limb} \cdot \left(\frac{di_{DC\_bottom\_phaseB}}{dt} - \frac{di_{DC\_bottom\_phaseC}}{dt}\right)$$

$$V_{conv\_phaseC} - V_{conv\_phaseA} = V_{bottom\_valve\_phaseC} - V_{bottom\_valve\_phaseA} -$$
$$L_{Limb} \cdot \left(\frac{di_{DC\_bottom\_phaseC}}{dt} - \frac{di_{DC\_bottom\_phaseA}}{dt}\right)$$

$$V_{conv\_phaseA} - V_{conv\_phaseB} = -V_{top\_valve\_phaseA} + V_{top\_valve\_phaseB} +$$
$$L_{Limb} \cdot \left(\frac{di_{DC\_top\_phaseA}}{dt} - \frac{di_{DC\_top\_phaseB}}{dt}\right)$$

$$V_{conv\_phaseB} - V_{conv\_phaseC} = -V_{top\_valve\_phaseB} + V_{top\_valve\_phaseC} +$$
$$L_{Limb} \cdot \left(\frac{di_{DC\_top\_phaseB}}{dt} - \frac{di_{DC\_top\_phaseC}}{dt}\right)$$

$$V_{conv\_phaseC} - V_{conv\_phaseA} = -V_{top\_valve\_phaseC} +$$
$$V_{top\_valve\_phaseC} + L_{Limb} \cdot \left(\frac{di_{DC\_top\_phaseC}}{dt} - \frac{di_{DC\_top\_phaseA}}{dt}\right)$$

In this manner, as shown in FIGS. 22 to 27, the controller 62 generates the clamping voltage values at the third terminals 42 required to limit the current circulating between the plurality of phase limbs 36 at or below a current threshold Delta_$I_{LMax}$. The controller 62 is programmed to generate a respective clamping voltage order signal $V_{be\_top\_Clamp}$, $V_{be\_bottom\_Clamp}$ for operating each valve 58 in the phase limbs 36 to clamp the AC voltages at the third terminals 42 at the respective clamping voltage values. In this manner, the controller is programmed to operate each valve 58 as a current limiter to limit a selected current circulating between the plurality of phase limbs 36 at or below a current threshold Delta_$I_{LMax}$.

Simulation Results

Figure 28:
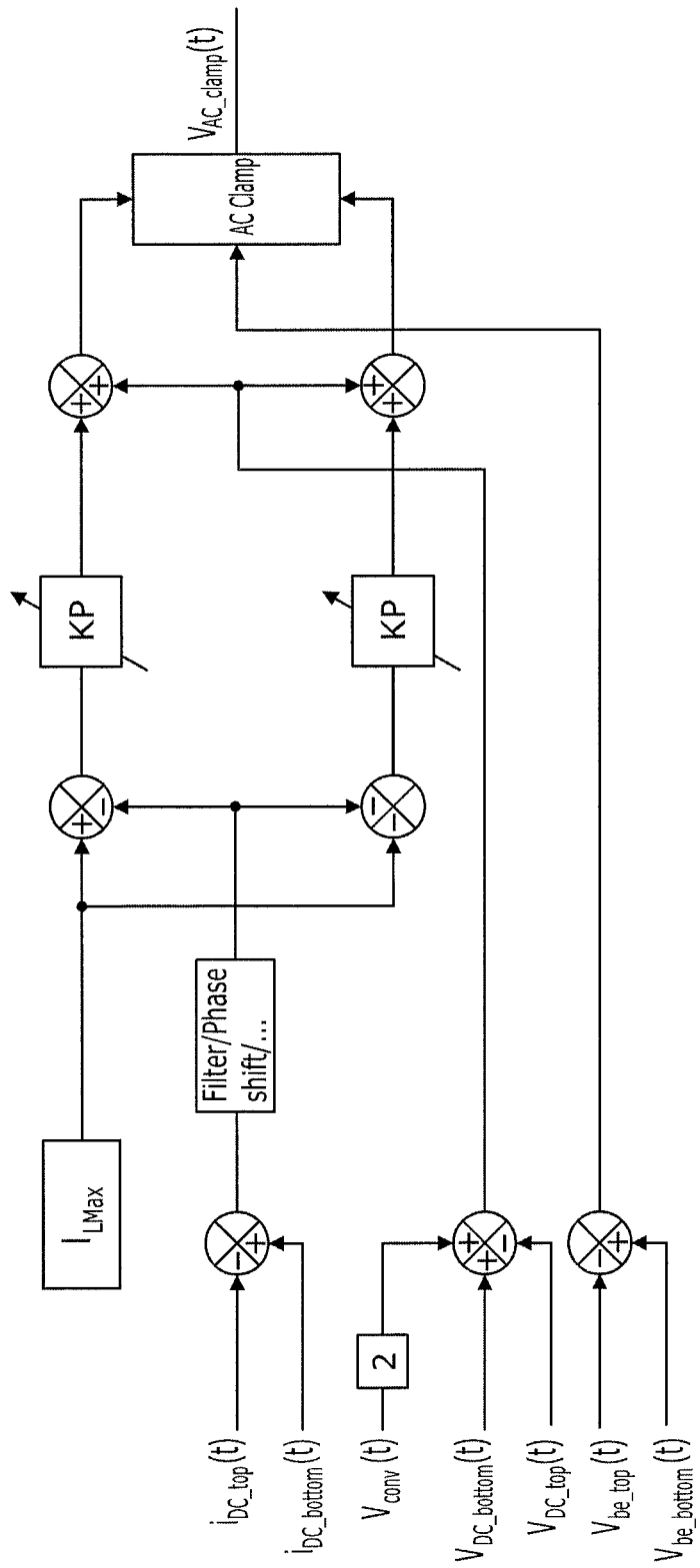
FIG. 28 shows, in schematic form, a first simulation topology of the controller.

FIG. 28 shows, in schematic form, a first simulation topology of the controller 62 used to simulate generation of a clamping order value $V_{AC\_clamp}$ at the third terminal 42 required to limit the current $i_{L\_transf}$ flowing into the phase limb 36 at or below the current threshold $I_{LMax}$ during an occurrence of a fault in one phase of the AC electrical network 46. The first simulation topology of the controller 62 is based on the second topology of the controller 62 shown in FIG. 10. In the first simulation topology, the controller 62 is programmed to generate the clamping voltage value $V_{AC\_Clamp}$ by processing the AC voltage $V_{conv}$ at the third terminal 42.

Figure 29:
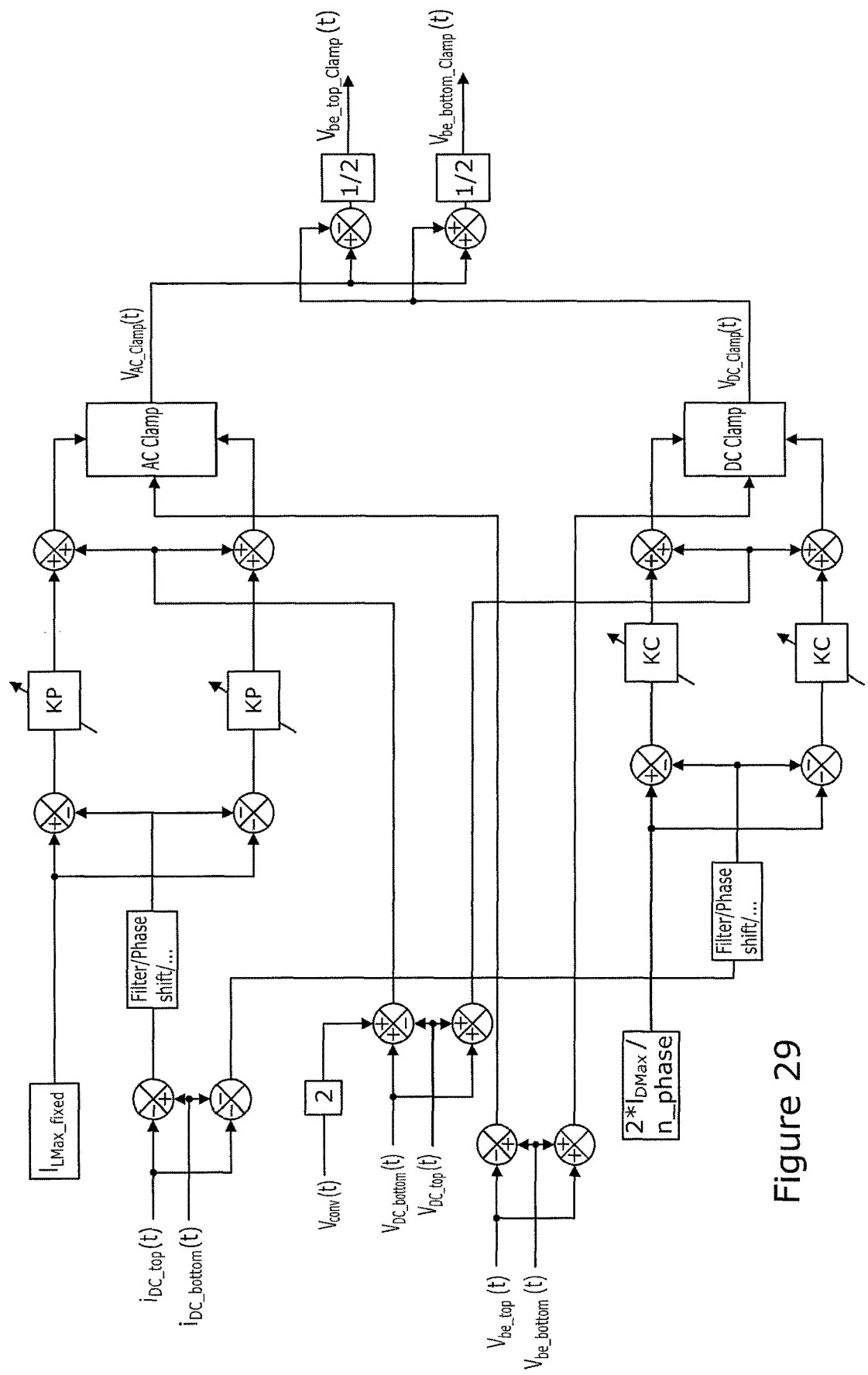
FIG. 29 shows, in schematic form, a second simulation topology of the controller.

FIG. 29 shows, in schematic form, a second simulation topology of the controller 62 used to simulate generation of clamping order values $V_{AC\_clamp}$, $V_{DC\_clamp}$ at the third terminal 42 and across the first and second DC terminals 32,34 required to limit the current $i_{L\_transf}$ flowing into the phase limb 36 at or below the current threshold $I_{LMax}$ during an occurrence of a fault in one phase of the AC electrical network 46. The second simulation topology of the controller 62 is based on the fifth topology of the controller 62 shown in FIG. 14. In the second simulation topology, the controller 62 is programmed to generate the clamping voltage value $V_{AC\_Clamp}$ by processing the AC voltage $V_{conv}$ at the third terminal 42.

Figure 30:
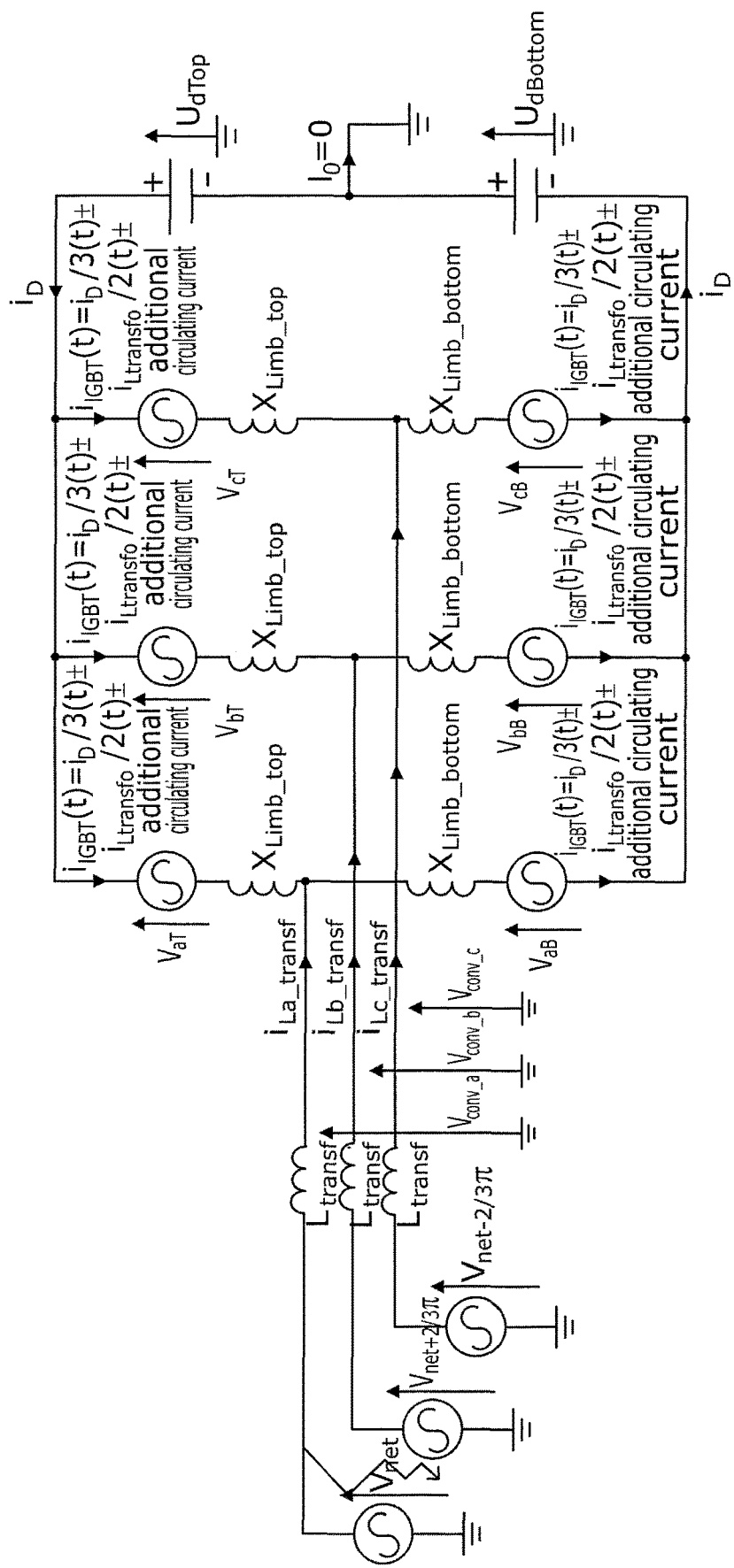
FIG. 30 shows, in schematic form, the occurrence of a fault in one phase of the AC electrical network.
Figure 31:
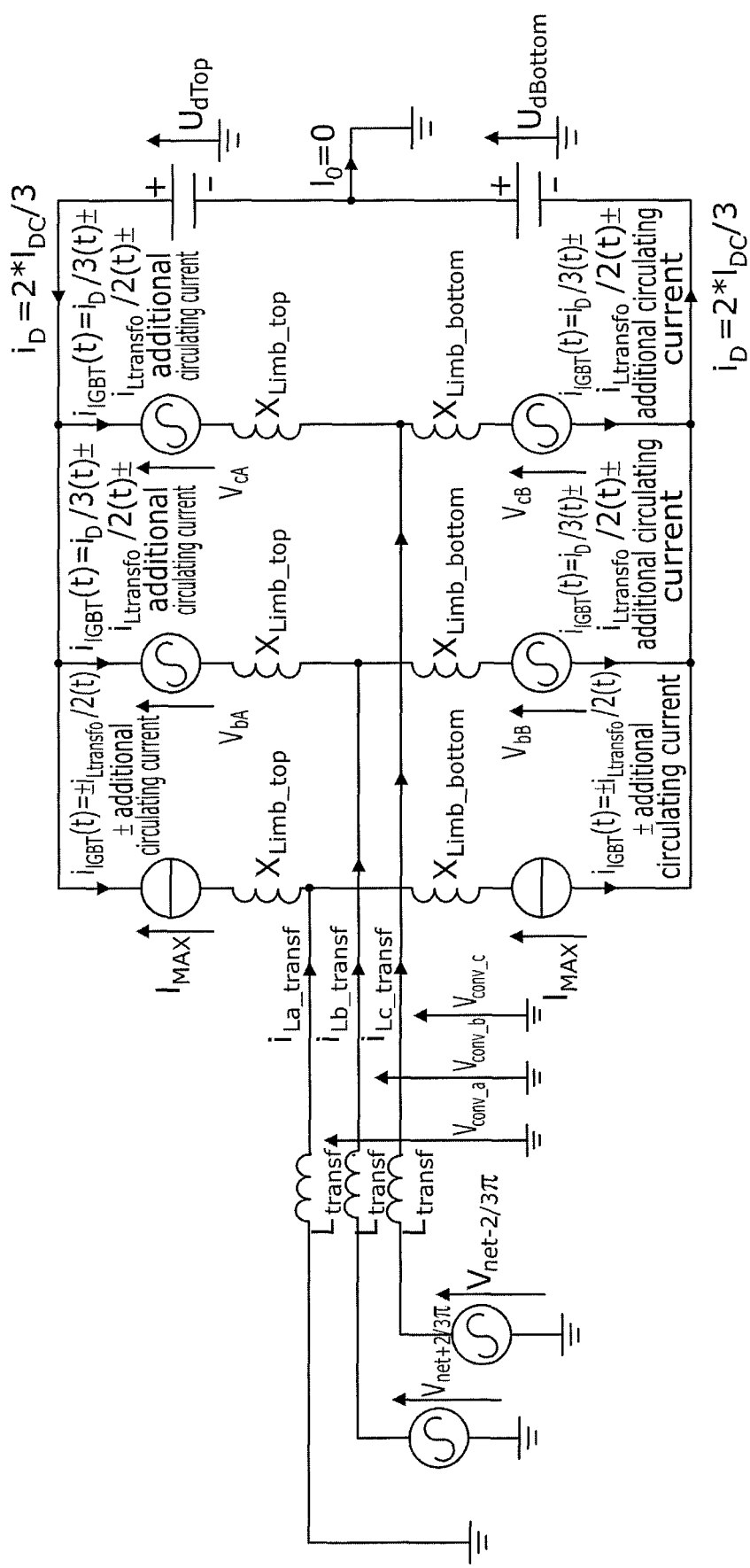
FIG. 31 shows, in schematic form, the operation of valves as current limiters during the occurrence of a fault in one phase of the AC electrical network.

FIG. 30 shows, in schematic form, the occurrence of a fault in one phase of the AC electrical network 46. FIG. 31 shows, in schematic form, the operation of the corresponding valves 58 as current limiters to limit the current $i_{L\_transf}$ flowing into the phase limb 36 at or below the current threshold $I_{LMax}$ during the occurrence of a fault in one phase of the AC electrical network 46.

In the simulations, the current $I_{DC\_MAX}$ flowing in the first and second DC terminals 32,34 is kept at a nominal value during the fault.

FIGS. 32 to 35 compare the behaviours of the current flowing in a phase limb 36 of the voltage source converter 30 during an occurrence of a fault in one phase of the AC electrical network 46 with and without the operation of the corresponding valves 58 as current limiters.

The simulation results in FIGS. 32 to 35 are based on a simulation of the voltage source converter 30 of FIG. 1 when applied in a HVDC point-to-point configuration. In the simulation, the power flow between the AC and DC electrical networks 44,46 is 720 MW, the DC voltage $V_{DC}$ across the DC terminals 32,34 is 600 kV and the current $I_{DC\_Bus}$ flowing in the DC electrical network 44 is 1200 A. The fault is in the form of a single-phase fault to ground, and is applied to the AC electrical network 24 for 1 second.

Figure 32:
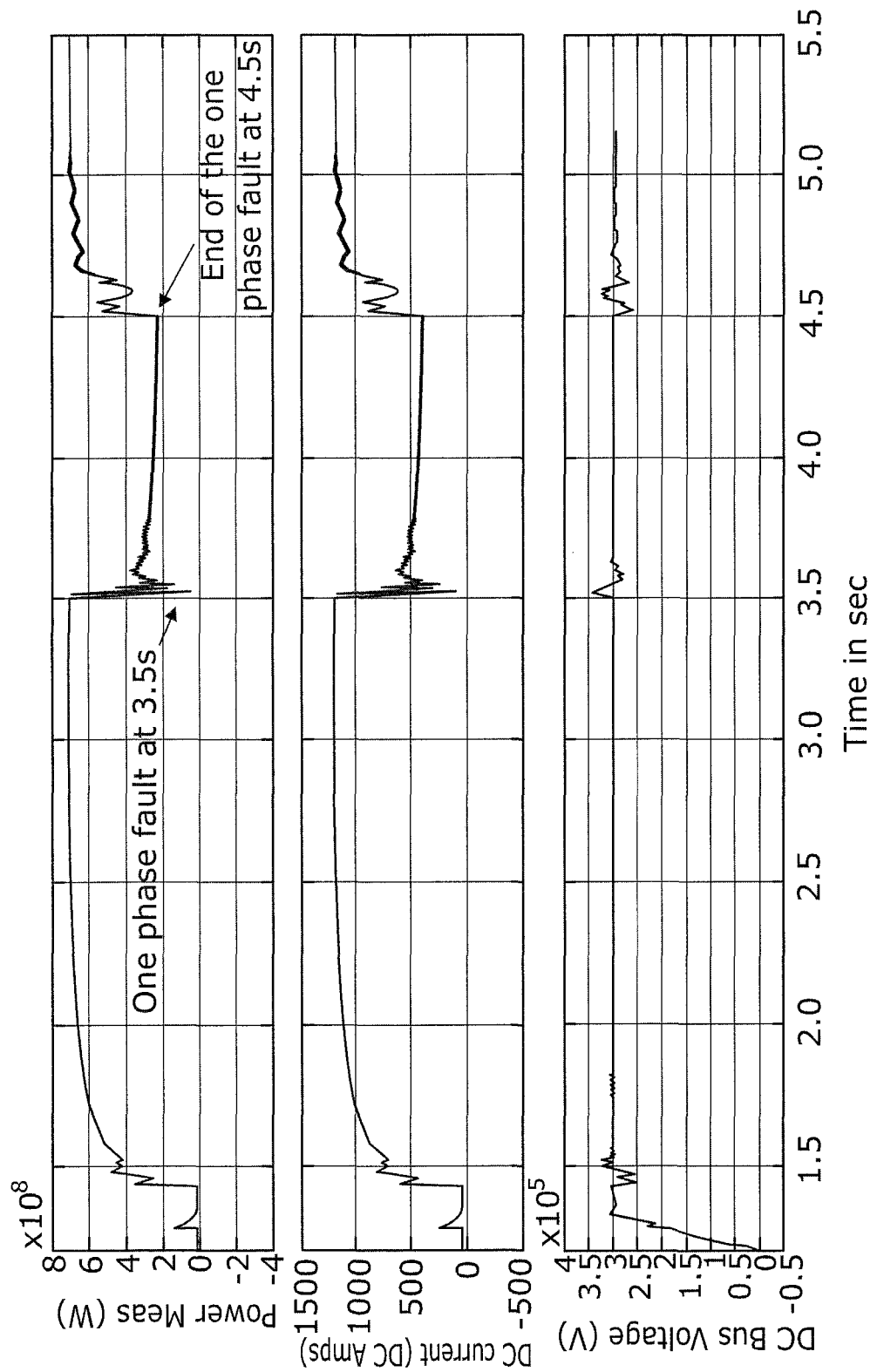
FIGS. 32 to 35 illustrate simulation results based on the first and second simulation topologies shown in FIGS. 28 and 29.

FIG. 32 illustrates the simulation of the DC power of the voltage source converter 30, the current $I_{LA\_transf}$ flowing into the third terminal 42, and the voltage across the first and second DC terminals 32,34 when the valves 58 are operated as current limiters to limit the current $i_{L\_transf}$ flowing into the phase limb 36 at or below the current threshold $I_{LMax}$ during an occurrence of a fault in one phase of the AC electrical network 46.

Figure 33:
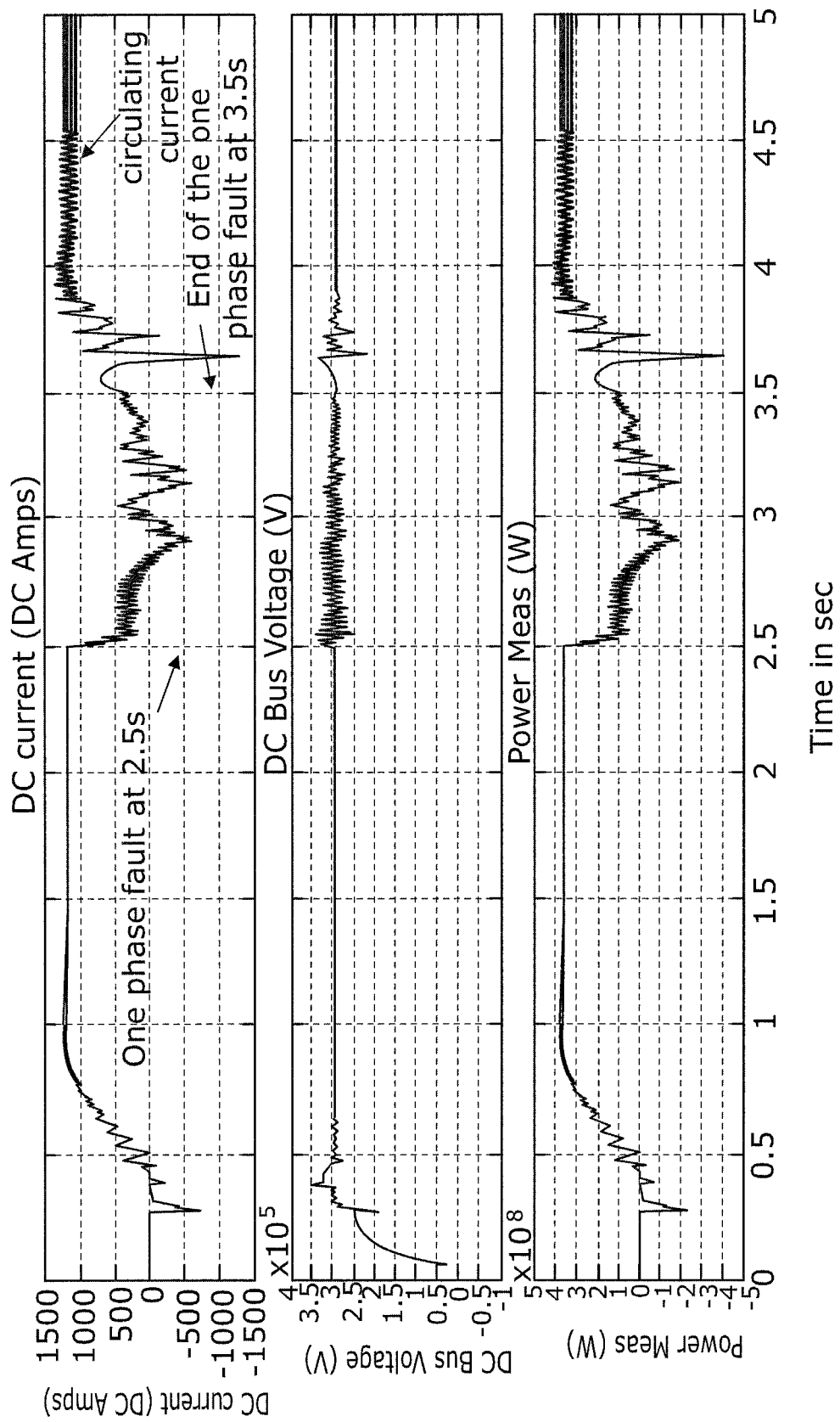

FIG. 33 illustrates the simulation of the DC power of the voltage source converter 30, the current $I_{LA\_transf}$ flowing into the third terminal 42, and the voltage across the first and second DC terminals 32,34 when the valves 58 are not operated as current limiters to limit the current $i_{L\_transf}$ flowing into the phase limb 36 at or below the current threshold $I_{LMax}$ during an occurrence of a fault in one phase of the AC electrical network 46.

Figure 34:
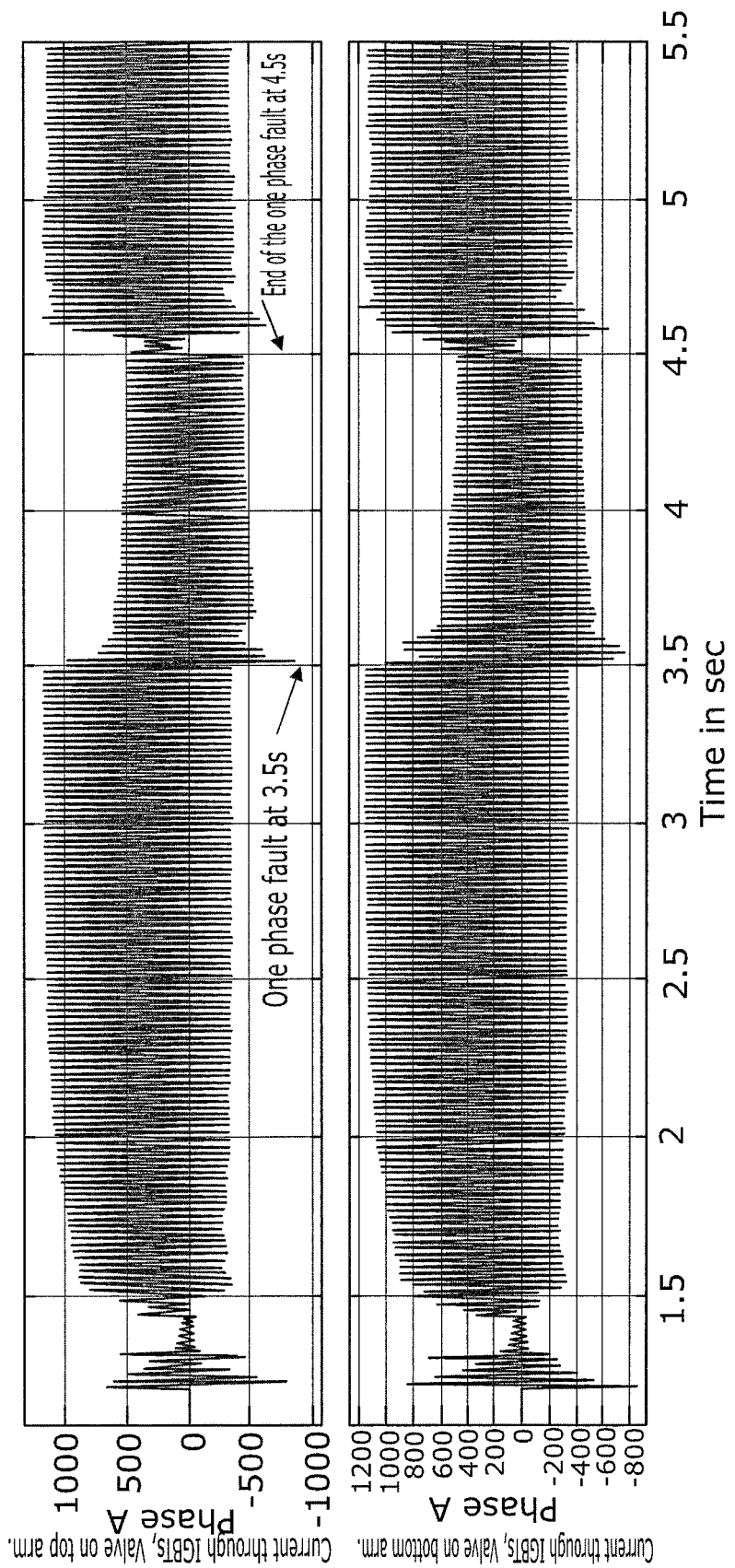

FIG. 34 illustrates the simulation of the currents flowing in the first and second converter arms 38,40 when the valves 58 are operated as current limiters to limit the current $i_{L\_transf}$ flowing into the phase limb 36 at or below the current threshold $I_{LMax}$ during an occurrence of a fault in one phase of the AC electrical network 46.

Figure 35:
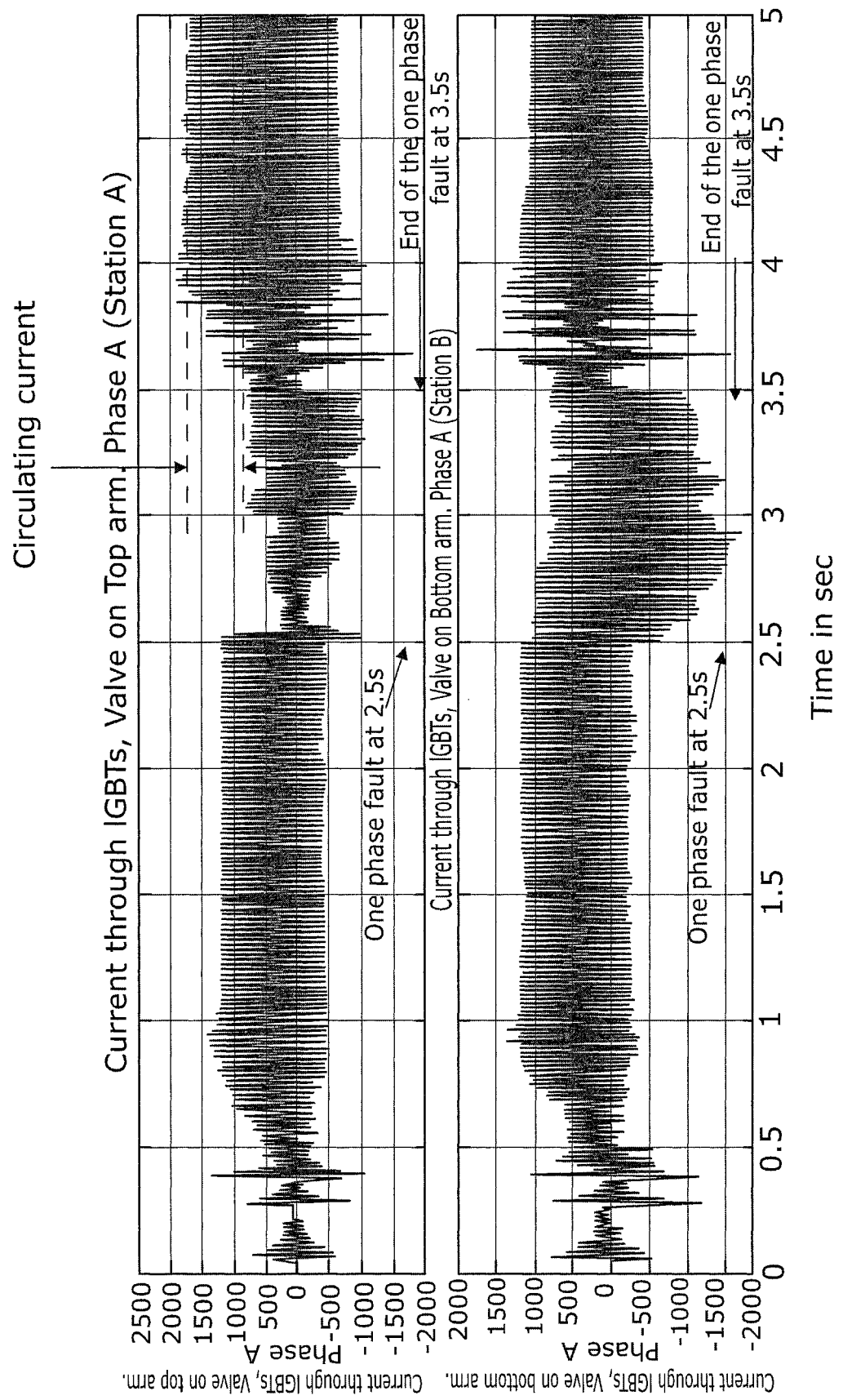

FIG. 35 illustrates the simulation of the currents flowing in the first and second converter arms 38,40 when the valves 58 are not operated as current limiters to limit the current $i_{L\_transf}$ flowing into the phase limb 36 at or below the current threshold $I_{LMax}$ during an occurrence of a fault in one phase of the AC electrical network 46.

It can be seen from FIG. 32 that the current Inc Bus flowing in the DC electrical network 44, the DC voltage $V_{DC}$ across the DC terminals 32,34 and the DC power flow in the DC electrical network 44 are stable and remain under control when the corresponding valves 58 are operated as current limiters. It can also be seen from FIG. 35 that the current $I_{DC\_top}$ in the first converter arm remains under control before, during and after the fault, without any significant peak current.

Meanwhile it can be seen from FIG. 33 that the current $I_{DC\_Bus}$ flowing in the DC electrical network 44, the DC voltage $V_{DC}$ across the DC terminals 32,34 and the DC power flow in the DC electrical network 44 are unstable and are relatively uncontrolled when the corresponding valves 58 are not operated as current limiters. In addition, the DC power flow in the DC electrical network 44 contains zero sequence oscillations. It can also be seen from FIG. 35 that the current $I_{DC\_top}$ in the first converter arm are unstable and are relatively uncontrolled before, during and after the fault, with any significant peak current that could damage the converter arm.

It will be appreciated that the topology of the voltage source converter 30 in the embodiment shown is merely chosen to help illustrate the operation of embodiments of the present invention, and that the voltage source converter 30 may be replaced by another voltage source converter with a different topology. It will also be appreciated that the topologies of the controller 62, as set out above, are merely chosen to help illustrate the operation of embodiments of the present invention, and that the controller 62 may be replaced by another controller with a different topology.

This written description uses examples to disclose the invention, including the preferred embodiments, and to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A voltage source converter comprising:
   a converter arm extending between two terminals, wherein each terminal is configured to connect to at least one respective electrical network, the converter arm including at least one valve comprising at least one module, wherein the at least one module is configured to selectively provide a voltage source, wherein the two terminals comprise:
      a first terminal and a second terminal configured to connect to a first electrical network; and
      a phase limb extending between the first terminal and second terminal, wherein the phase limb comprises a first phase limb and a second phase limb separated by a third terminal, wherein each phase limb extends between the third terminal and the first terminal and second terminal respectively, and wherein the third terminal is configured to connect to a second electrical network, either or both of the first phase limb and second phase limb being in the form of a converter arm,
   wherein the controller is programmed to selectively operate the at least one valve to clamp a voltage at either or both of the third terminal and first terminal or the second terminal and operate the at least one valve as a current limiter to limit a selected current flowing in a respective converter arm at or below a fixed or variable current threshold; and a controller programmed to selectively operate the at least one valve to clamp a voltage at either or both of the two terminals and operate the at least one valve as a current limiter to limit a selected current flowing in the converter arm at or below a fixed or variable current threshold.

2. The voltage source converter of claim 1, wherein the controller is programmed to operate the at least one valve as a current limiter in response to the selected current reaching or exceeding the current threshold.

3. The voltage source converter of claim 1, wherein the controller is programmed to operate the at least one valve as a current limiter during an occurrence of a fault or disturbance in the at least one electrical network.

4. The voltage source converter of claim 3, wherein the at least one electrical network is an AC electrical network.

5. The voltage source converter of claim 3, wherein the at least one electrical network is a DC network.

6. The voltage source converter of claim 1, wherein the controller is programmed to selectively operate the converter arm to transfer power between the two terminals when the at least one valve is operated as a current limiter.

7. The voltage source converter of claim 1, wherein the controller is programmed to selectively operate the at least one valve to clamp a voltage at either or both of the third terminal and the first terminal or the second terminal and operate the at least one valve as a current limiter to limit a selected current flowing in or into the phase limb at or below a fixed or variable current threshold.

8. The voltage source converter of claim 1 comprising a plurality of phase limbs, wherein the controller is programmed to selectively operate the at least one valve to clamp a voltage at either or both of the third terminal and the first terminal or the second terminal and operate the at least one valve as a current limiter to limit a selected current flowing between the plurality of phase limbs at or below a fixed or variable current threshold.

9. The voltage source converter of claim 1, wherein the controller is programmed to selectively operate each phase limb to transfer power between the third terminal and the first terminal or the second terminal when the at least one valve is operated as a current limiter.

10. The voltage source converter of claim 1, comprising a plurality of phase limbs, wherein the third terminal of each phase limb is configured to be connected to a respective phase of a multi-phase AC electrical network.

11. The voltage source converter of claim 1, wherein the controller is programmed to process at least one voltage parameter to generate a respective clamping voltage order signal and operate the at least one valve as a current limiter.

12. The voltage source converter claim 11, wherein the at least one voltage parameter is selected from a group consisting of: a voltage at the third terminal; a voltage across the converter arm; a voltage of the second electrical network; or a combination of a voltage of the second electrical network and at least one harmonic voltage components.

13. The voltage source converter of claim 1, wherein the at least one module comprises at least one switching element and at least one energy storage device, wherein the at least one switching element and the at least one energy storage device in the at least one module combine and selectively provide a voltage source.

* * * * *